(12) United States Patent
Nakao

(10) Patent No.: US 10,795,600 B2
(45) Date of Patent: Oct. 6, 2020

(54) INFORMATION PROCESSING APPARATUS, METHOD, AND STORAGE MEDIUM FOR AVOIDING ACCIDENTAL DATA DELETION DURING DATA MIGRATION

(71) Applicant: FUJITSU LIMITED, Kawasaki-shi, Kanagawa (JP)

(72) Inventor: Takanori Nakao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/449,498

(22) Filed: Jun. 24, 2019

(65) Prior Publication Data

US 2019/0310792 A1 Oct. 10, 2019

Related U.S. Application Data

(63) Continuation of application No. PCT/JP2017/046965, filed on Dec. 27, 2017.

(30) Foreign Application Priority Data

Jan. 20, 2017 (JP) ................... 2017-008294

(51) Int. Cl.
*G06F 3/06* (2006.01)
*G06F 12/00* (2006.01)

(52) U.S. Cl.
CPC .............. *G06F 3/0647* (2013.01); *G06F 3/06* (2013.01); *G06F 3/0604* (2013.01); *G06F 3/0673* (2013.01); *G06F 12/00* (2013.01)

(58) Field of Classification Search
None
See application file for complete search history.

(56) References Cited

U.S. PATENT DOCUMENTS 4,638,424 A 1/1987 Beglin et al.
2006/0085614 A1 4/2006 Sakai et al.
(Continued)

FOREIGN PATENT DOCUMENTS

JP 60-147855 8/1985
JP 2006-039942 2/2006
(Continued)

OTHER PUBLICATIONS

OpenStack, "Swift/HighLatencyMedia", [online], [searched on Jan. 13, 2017], Internet <URL:https://wiki.openstack.org/wiki/Swift/HighLatencyMedia> (6 pages).
(Continued)

*Primary Examiner* — Edward J Dudek, Jr.
*Assistant Examiner* — Ralph A Verderamo, III
(74) *Attorney, Agent, or Firm* — Fujitsu Patent Center

(57) ABSTRACT

A method includes: executing a reception process that includes receiving a request including any of a first request and a second request; and executing a control process that includes performing a first process when the first request is received, the first request being a request for executing a first migration process configured to migrate data from a first storage device to a second storage device having a higher access speed than the first storage device, the first process including recording state information and starting the execution of the first migration process, and performing a second process when the second request is received, the second request being a request for executing a second migration process configured to migrate the data from the second storage device to the first storage device, the second process including stopping the first migration process before starting the execution of the second migration process.

18 Claims, 16 Drawing Sheets

(56) References Cited

U.S. PATENT DOCUMENTS

| | | | | |
|---|---|---|---|---|
| 2009/0228532 A1* | 9/2009 | Anzai | ................... | G06F 16/119 |
| 2011/0078112 A1* | 3/2011 | Takata | ................ | G06F 16/1748 |
| | | | | 707/622 |
| 2011/0197039 A1* | 8/2011 | Green | ................... | G06F 3/0665 |
| | | | | 711/162 |
| 2011/0270945 A1* | 11/2011 | Shiga | ................... | G06F 3/0647 |
| | | | | 709/213 |
| 2015/0378619 A1 | 12/2015 | Maeda et al. | | |

FOREIGN PATENT DOCUMENTS

| | | |
|---|---|---|
| JP | 2006-113882 | 4/2006 |
| JP | 2014-199581 | 10/2014 |

OTHER PUBLICATIONS

International Search Report and Written Opinion of the International Searching Authority, mailed in connection with PCT/JP2017/046965 and dated Mar. 6, 2018 (10 pages).

* cited by examiner

FIG. 8

| | | SUBSEQUENTLY REQUESTED PROCESS | | |
|---|---|---|---|---|
| | | PUT | migration | recall |
| PREVIOUSLY REQUESTED PROCESS | PUT | - | P2-2 | P2-1 |
| | migration | P1 | P2-1 | P1 |
| | recall | P1 | P1 | P2-1 |

500 ured to migrate the data from the second storage device to the first storage device, the second process including stopping the execution of the first migration process and starting the execution of the second migration process, in a case where the state information indicates that the first migration process is being executed.

INFORMATION PROCESSING APPARATUS, METHOD, AND STORAGE MEDIUM FOR AVOIDING ACCIDENTAL DATA DELETION DURING DATA MIGRATION

CROSS-REFERENCE TO RELATED APPLICATION

This application is a continuation application of International Application PCT/JP2017/046965 filed on Dec. 27, 2017 and designated the U.S., the entire contents of which are incorporated herein by reference. The International Application PCT/JP2017/046965 is based upon and claims the benefit of priority of the prior Japanese Patent Application No. 2017-008294, filed on Jan. 20, 2017, the entire contents of which are incorporated herein by reference.

FIELD

The embodiments discussed herein are related to an information processing apparatus, an information processing method, and a non-transitory computer-readable storage medium for storing a program.

BACKGROUND

For storage devices, generally, the higher the access performance, the higher the cost per capacity. Therefore, the type and model of the storage device are selected in consideration of the balance between the access performance and capacity in demand and upper limit of cost.

From such a point of view, it is considered to effectively use a plurality of storage devices with different access performance. For example, a storage tiering technique is known, in which storage devices in a storage system are tiered according to access performance and data is migrated between tiers. In this technique, frequently accessed data is allocated to a storage device with high access performance, and less frequently accessed data is allocated to a storage device with low access performance.

Also, in recent years, an object storage having a feature of high scalability and security is widely used. The application of the above storage tiering technique is also considered for the object storage.

For example, in "OpenStack Object Storage: Swift", it is proposed to implement migration and recall as an extended specification of application programming interface (API). Migration is a process of moving data from a storage device with high access performance such as a hard disk drive (HDD) to a storage device with low access performance such as an optical disk or magnetic tape. Recall is a process of migrating data in the opposite direction.

As an example of a technique related to the object storage, a technique for speeding up reading of time series data stored in a storage node has been proposed.

Examples of the related art include Japanese Laid-open Patent Publication No. 2014-199581.

Examples of the related art include OpenStack, "Swift/HighLatencyMedia", [online], [search on Jan. 13, 2017], Internet <URL: https://wiki.openstack.org/wiki/Swift/High-LatencyMedia>

SUMMARY

According to an aspect of the embodiments, a method for an information process, the method includes: executing a reception process that includes receiving a request, the request including any of a first request and a second request; and executing a control process that includes performing a first process when the first request is received by the reception process, the first request being a request for executing a first migration process configured to migrate data from a first storage device to a second storage device having a higher access speed than the first storage device, the first process including recording state information indicating that the first migration process is being executed and starting the execution of the first migration process, and performing a second process when the second request is received by the reception process, the second request being a request for executing a second migration process config The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of a control pattern according to a combination of processing;

DESCRIPTION OF EMBODIMENTS

By the way, in the storage tiering technique, when data movement (here, "migrate") from a storage device with high access performance to a storage device with low access performance and movement (here, "recall") of the same data in the opposite direction are executed at close time, there is a problem that data may be deleted accidentally. This problem may occur, for example, in a case where migration is executed immediately after recall.

The recall process includes a process of reading data from the storage device with low access performance and writing the data in the storage device with high access performance, and a process of deleting data stored in the former storage device. Thus, in the recall process, two accesses are made to the storage device with low access performance. On the other hand, in the migration process, only one time of access for writing data is performed to the storage device with low access performance, and therefore, the time taken for the migration process is shorter than the time taken for the recall process. Therefore, in a case where migration is executed immediately after the recall, the progress of the recall may be delayed, and data deletion may be executed by the recall after the completion of writing of data to the storage device with low access performance by migration. In this case, data written by migration is deleted accidentally.

In one aspect, the embodiment provides an information processing apparatus, an information processing method, and an information processing program that suppresses data loss in a case where migration of the same data between storage devices with different access performance is requested at close time.

Hereinafter, embodiments will be described with reference to drawings.

First Embodiment

Figure 1:
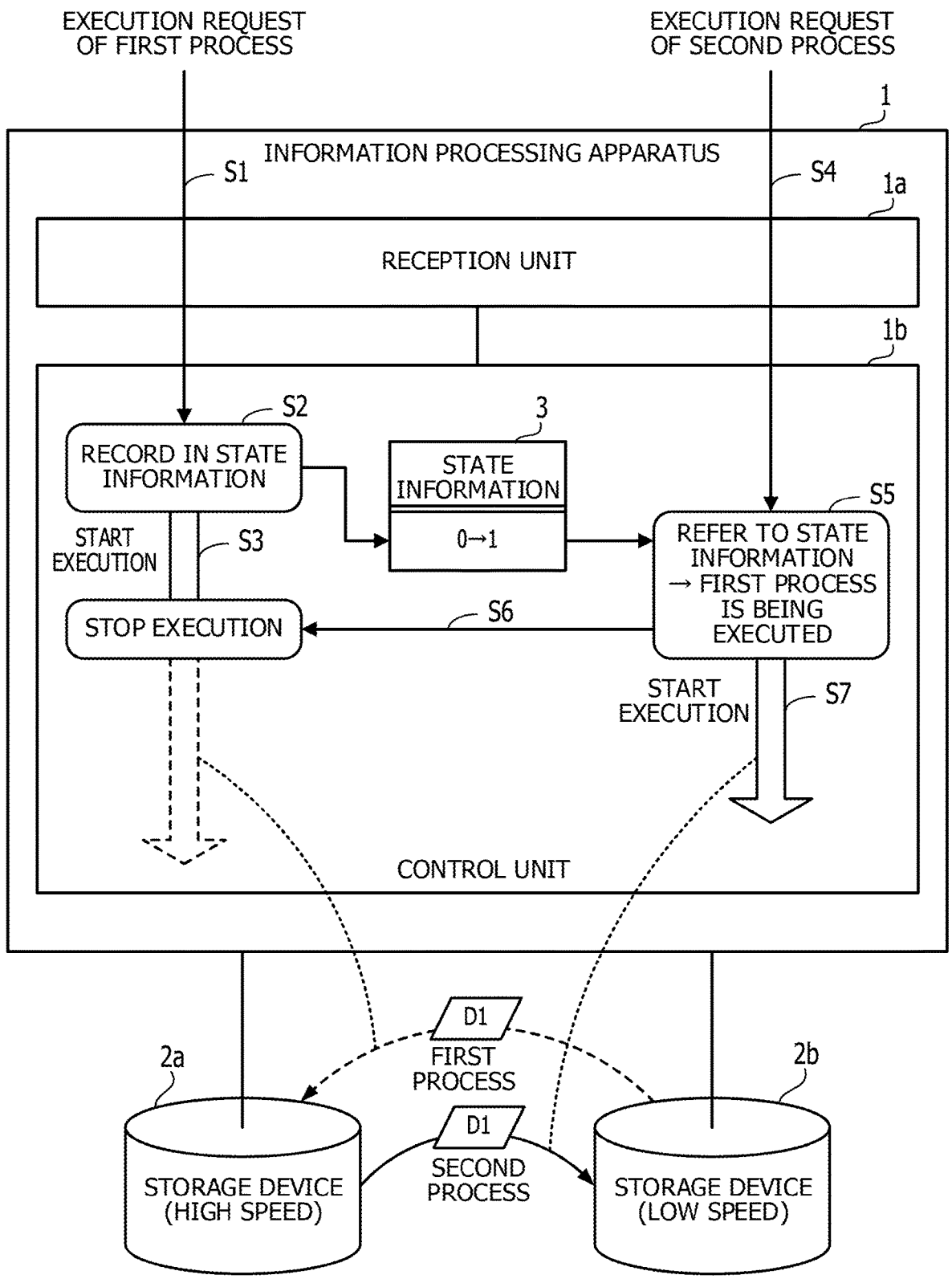
FIG. 1 is a diagram illustrating an example of a configuration and an example of processing of an information processing apparatus according to a first embodiment.

FIG. 1 is a diagram illustrating an example of a configuration and an example of processing of an information processing apparatus according to a first embodiment. An information processing apparatus 1 illustrated in FIG. 1 is an apparatus capable of controlling data migration processing between a storage device 2a and a storage device 2b. Here, it is assumed that the access speed of the storage device 2a is higher than that of the storage device 2b.

The information processing apparatus 1 includes a reception unit 1a and a control unit 1b. The reception unit 1a is realized, for example, as a communication interface. The control unit 1b is realized, for example, as a processor.

The reception unit 1a can receive a process execution request from another device (not illustrated).

When the reception unit 1a receives an execution request for a first process of migrating data (referred to as "data D1") from the storage device 2b to the storage device 2a (step S1), the control unit 1b records in state information 3 that the first process is being executed (step S2) and starts the execution of the first process (step S3). In the example of FIG. 1, the state information 3 is set to a value of either "0" or "1". "0" indicates that the first process is not being executed, and "1" indicates that the first process is being executed. Therefore, in step S2, the state information 3 is updated from "0" to "1".

When the first process is completed, the control unit 1b records in the state information 3 that the first process is not being executed. In the example of FIG. 1, the control unit 1b updates the state information 3 from "1" to "0".

The control unit 1b refers to the state information 3 (step S5) when the reception unit 1a receives an execution request for a second process of migrating the same data D1 from the storage device 2a to the storage device 2b (step S4). Here, when it is recorded in the state information 3 that the first process is being executed, the control unit 1b stops the execution of the first process (step S6) and start the execution of the second process (step S7).

Thus, in a case where execution of the second process is requested immediately after execution of the first process is requested, the execution of the first process is canceled and only the second process is executed. Therefore, the first process and the second process are executed in parallel, and the progress of the first process is delayed, whereby it is possible to avoid the situation where the data D1 written to the storage device 2b as a result of the second process is mistakenly deleted.

For example, the first process includes a process of reading the data D1 from the storage device 2b and writing the data D1 into the storage device 2a, and a process of deleting the data stored in the storage device 2b. As described above, in the process of the first process, two times of access is performed to the storage device 2b with low access performance. On the other hand, in the process of the first process, only one time of access for writing the data D1 is performed to the storage device 2b, and therefore, the time taken for the second process is shorter than the time taken for the first process. Therefore, in a case where the second process is executed immediately after the start of the execution of the first process, the progress of the first process may be delayed, and after the completion of the writing of the data D1 to the storage device 2b by the second process, deletion of data D1 by the first process may be executed.

The control unit 1b may avoid the occurrence of a situation where the data D1 is lost as described above by stopping the execution of the first process and then starting the execution of the second process.

Since the second process is a process of returning the storage position of the data D1 migrated by the first process to the original storage device 2b, even if the execution of the first process is stopped halfway, there is no change in the process result (that is, the storage position of the data D1).

Second Embodiment

Next, as a second embodiment, an example of a storage system including the information processing apparatus 1 illustrated in FIG. 1 will be described.

Figure 2:
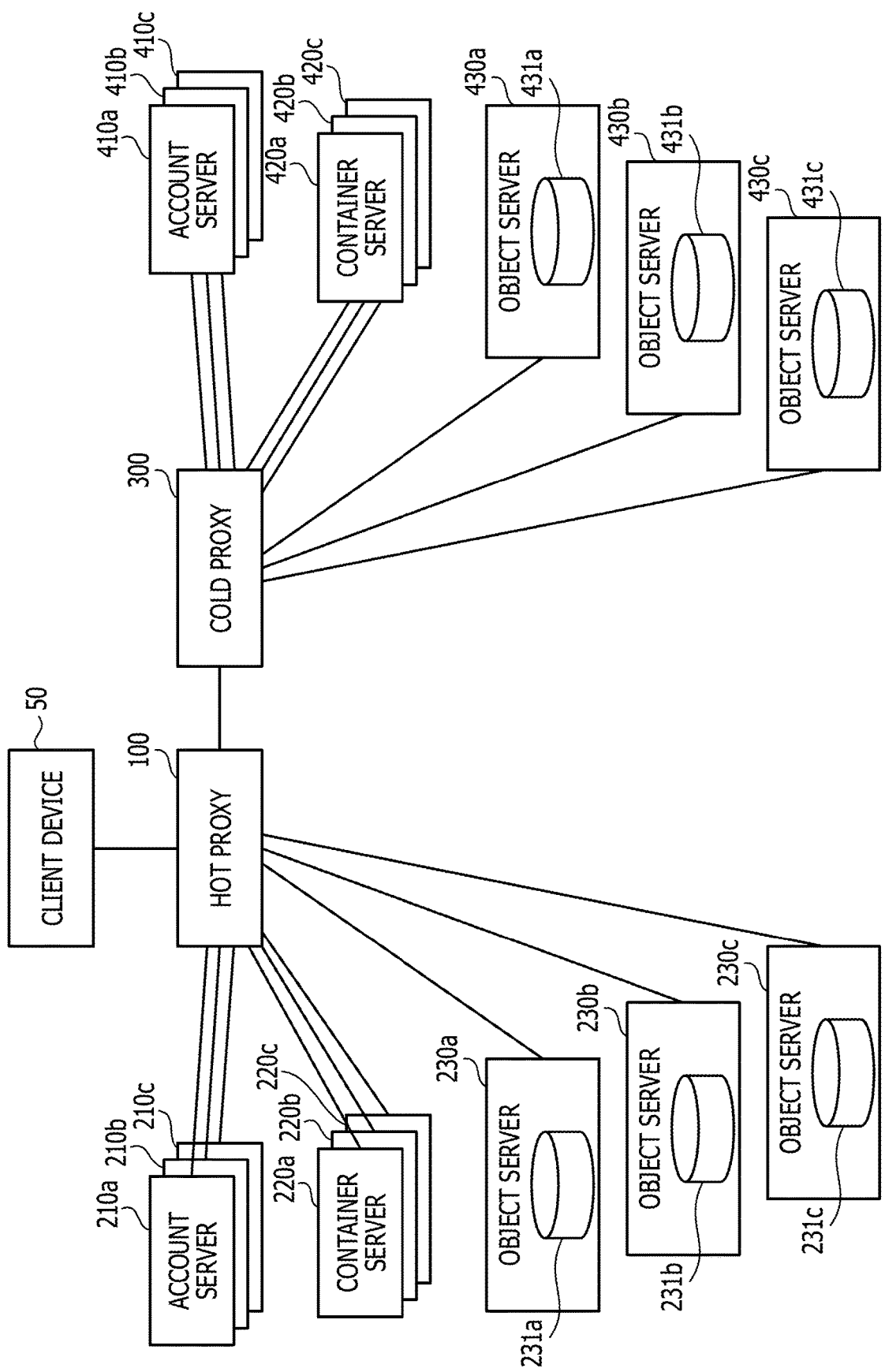
FIG. 2 is a diagram illustrating an example of a configuration of a storage system according to a second embodiment.

FIG. 2 is a diagram illustrating an example of a configuration of a storage system according to a second embodiment. The storage system illustrated in FIG. 2 is a distributed object storage system in which object storages in which data are handled in object units are distributed and disposed in a plurality of storage nodes. In the present embodiment, as an example, the storage system illustrated in FIG. 2 conforms to "OpenStack Object Storage: Swift".

In the storage system illustrated in FIG. 2, a plurality of account servers, a plurality of container servers, and a plurality of object servers are connected to a hot proxy 100. In the present embodiment, it is assumed that, as an example, account servers 210a, 210b, 210c, container servers 220a, 220b, 220c, and object servers 230a, 230b, 230c are connected to the hot proxy 100. A client device 50 is connected to the hot proxy 100. A plurality of client devices 50 may be connected to the hot proxy 100.

The hot proxy 100 is an example of the information processing apparatus 1 illustrated in FIG. 1. The hot proxy 100 is a proxy server that functions as a front end for accessing an object. The hot proxy 100 provides the client device 50 with an API for accessing an object. The client device 50 requests the hot proxy 100 to access a desired object by specifying a uniform resource identifier (URI) for identifying the object.

Objects are managed by three types of information: accounts, containers, and objects. The URI indicating an object includes binary information indicating an account, a container, and an object.

The account indicates the storage location of the container. An account in charge of management is assigned to each of the account servers 210a, 210b, and 210c. Each of the account servers 210a, 210b, and 210c manage a list of containers under the account in charge of management.

A container indicates the storage location of an object. A container in charge of management is assigned to each of the container servers 220a, 220b, and 220c. Each of the container servers 220a, 220b, and 220c manages a list of objects under the container in charge of management.

The object servers 230a, 230b, and 230c respectively include storages 231a, 231b, and 231c in which objects are stored. Objects include data and metadata. For example, data contained in an object is stored in the storage as a file, and metadata contained in the object is stored in an extended attribute of the file.

The client device 50 may transmit, to the hot proxy 100, for example, a command "GET" for reading data of an object and a command "PUT" for writing data of the object. Hereinafter, using these command names, the process of reading object data will be referred to as "GET process", and the process of writing object data will be referred to as "PUT process".

When an access from the client device 50 to an object is requested, the hot proxy 100 accesses the object while communicating with any account server, any container server, and any object server. Here, the processing procedure in a case where the hot proxy 100 receives a GET command and a PUT command will be described.

First, when the hot proxy 100 receives a GET command from the client device 50, the hot proxy 100 inquires of the account server determined from the specified URI among the account servers 210a, 210b, and 210c for the account information. Then, the account server returns account information specifying a container server corresponding to the object.

The hot proxy 100 inquires of the container server specified by the account information among the container servers 220a, 220b, and 220c for the container information. Then, container information in which the object server corresponding to the object is specified is returned from the container server.

The hot proxy 100 requests the object server specified by the container information among the object servers 230a, 230b, and 230c to read the object. Then, data contained in the object is returned from the object server. The hot proxy 100 transmits the received data to the client device 50 that is the transmission source of the GET command.

On the other hand, when the hot proxy 100 receives a PUT command from the client device 50, the hot proxy 100 inquires of the account server determined from the specified URI among the account servers 210a, 210b, and 210c for the account information. Then, the account server returns account information specifying a container server corresponding to the object.

The hot proxy 100 inquires of the container server specified by the account information among the container servers 220a, 220b, and 220c for the container information. Then, container information in which the object server corresponding to the object is specified is returned from the container server.

The hot proxy 100 transmits the data received together with the PUT command to the object server specified by the container information among the object servers 230a, 230b, and 230c to request the writing of the object. Then, the object server notifies the completion of writing data to the object. Actually, the completion of writing is notified to the hot proxy 100 after an object registration request from the object server to the container server and an update notification of the object from the container server to the account server are performed.

The hot proxy 100 notifies the client device 50 that is the transmission source of the PUT command that writing has been completed.

The functions of the account servers 210a, 210b, and 210c, the container servers 220a, 220b, and 220c, and the object servers 230a, 230b, and 230c may not be implemented in separate devices. For example, the account server 210a, the container server 220a, and the object server 230a may be implemented in the same device. The account server 210b, the container server 220b, and the object server 230b may be implemented in the same device. Furthermore, the account server 210c, the container server 220c, and the object server 230c may be implemented in the same device.

Next, in the storage system illustrated in FIG. 2, a cold proxy 300 is further connected to the hot proxy 100. The cold proxy 300 is connected with a plurality of account servers, a plurality of container servers, and a plurality of object servers. In the present embodiment, as an example, it is assumed that account servers 410a, 410b, and 410c, container servers 420a, 420b, and 420c, and object servers 430a, 430b, and 430c are connected to the cold proxy 300.

The account servers 410a, 410b, and 410c are server devices capable of executing the same processes as the account servers 210a, 210b, and 210c. The container servers 420a, 420b, and 420c are server devices capable of executing the same processes as the container servers 220a, 220b, and 220c. The object servers 430a, 430b, and 430c are server devices capable of executing the same processes as the object servers 230a, 230b, and 230c. The object servers 430a, 430b, and 430c respectively include storages 431a, 431b, and 431c in which objects are stored.

The cold proxy 300, the account servers 410a, 410b, and 410c, the container servers 420a, 420b, and 420c, and the object servers 430a, 430b, and 430c construct an independent object storage system. The cold proxy 300 is a proxy server in which the hot proxy 100 functions as a front end for accessing objects stored in the object storage system. The cold proxy 300 may at least receive at least GET and PUT commands from the hot proxy 100 and process these commands by the same procedure as the hot proxy 100.

The storages 431a, 431b, and 431c provided in the object servers 430a, 430b, and 430c have lower access speeds than the storages 231a, 231b, and 231c provided in the object servers 230a, 230b, and 230c. For example, the storages 431a, 431b, and 431c are realized as an optical disk or a magnetic tape, and the storages 231a, 231b, and 231c are realized as an HDD or a solid state drive (SSD).

In the storage system illustrated in FIG. 2, it is possible to migrate data contained in an object between the storages 231a, 231b, and 231c, and the storages 431a, 431b, and 431c. This data migration is performed in response to an instruction from the client device 50. The client device 50 controls data migration such that frequently accessed data is stored in the storages 231a, 231b, and 231c, and less frequently accessed data is stored in the storages 431a, 431b, and 431c.

As described above, in the storage system illustrated in FIG. 2, storage tiering control is performed in which storage areas are tired by the storages 231a, 231b, and 231c having high access speeds and the storages 431a, 431b, and 431c having low access speeds. Thus, it is possible to reduce the capacities of the storages 231a, 231b, and 231c, which have high access performance and high cost per capacity. As a result, it is possible to preferably balance the access performance of data and the cost of introducing storage devices.

Figure 3:
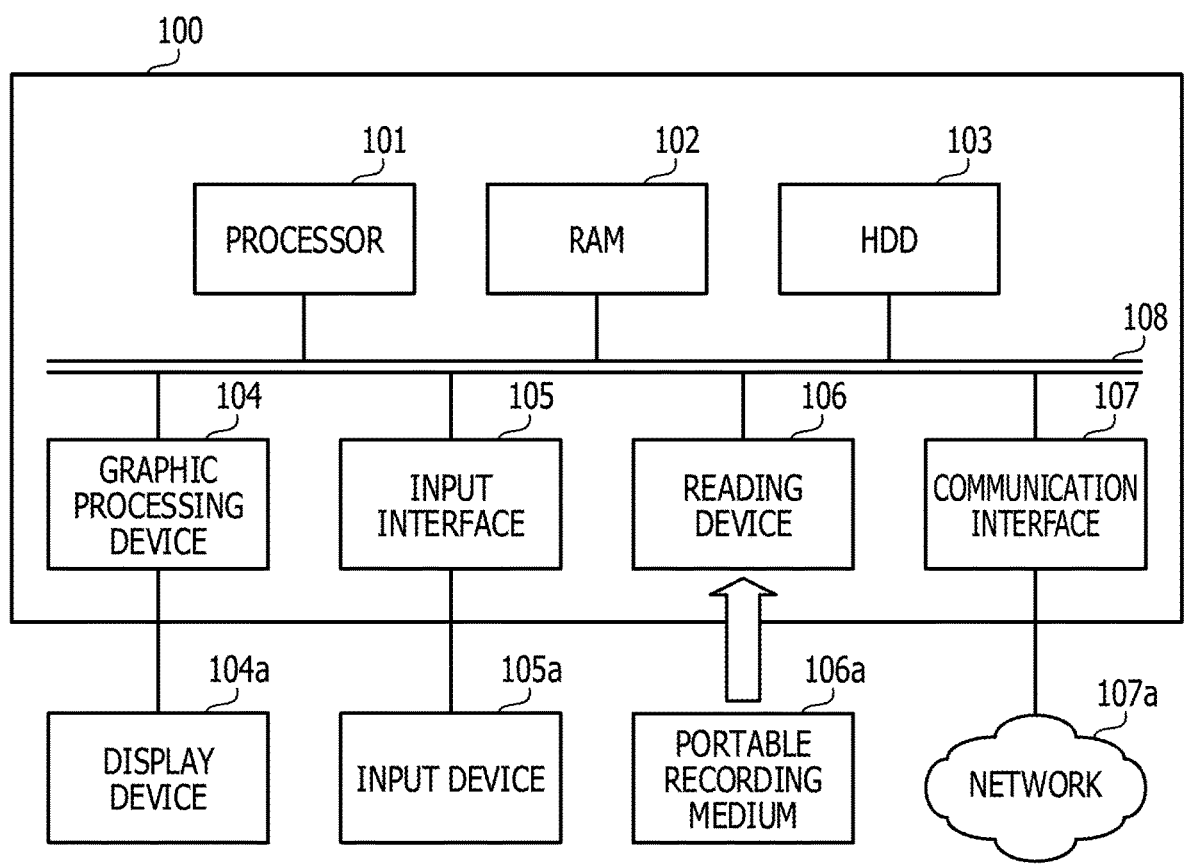
FIG. 3 is a diagram illustrating an example of a hardware configuration of a hot proxy.

FIG. 3 is a diagram illustrating an example of a hardware configuration of a hot proxy. The hot proxy 100 is realized, for example, as a computer as illustrated in FIG. 3. The hot proxy 100 is entirely controlled by a processor 101.

The processor 101 may be a multiprocessor. The processor 101 is, for example, a central processing unit (CPU), a micro processing unit (MPU), a digital signal processor (DSP), an application specific integrated circuit (ASIC), or a programmable logic device (PLD). The processor 101 may be a combination of two or more elements of a CPU, an MPU, a DSP, an ASIC, and a PLD. The processor 101 is, for example, an example of the control unit 1b illustrated in FIG. 1.

A random access memory (RAM) 102 and a plurality of peripheral devices are connected to the processor 101 via a bus 108.

The RAM 102 is used as a main storage device of the hot proxy 100. In the RAM 102, at least a part of an Operating System (OS) program and an application program to be executed by the processor 101 is temporarily stored. In addition, various data for processing by the processor 101 is stored in the RAM 102.

As peripheral devices connected to the bus 108, there are an HDD 103, a graphic processing device 104, an input interface 105, a reading device 106, and a communication interface 107.

The HDD 103 is used as an auxiliary storage device of the hot proxy 100. The HDD 103 stores an OS program, an application program, and various data. Other types of non-volatile storage devices, such as SSDs, may also be used as the auxiliary storage device.

A display device 104a is connected to the graphic processing device 104. The graphic processing device 104 causes the display device 104a to display an image in accordance with an instruction from the processor 101. Examples of the display device 104a include a liquid crystal display and an organic electroluminescence (EL) display.

An input device 105a is connected to the input interface 105. The input interface 105 transmits the signal output from the input device 105a to the processor 101.

The input device 105a includes a keyboard, a pointing device, and the like. Examples of the pointing device include a mouse, a touch panel, a tablet, a touch pad, and a trackball.

A portable recording medium 106a is attached to and detached from the reading device 106. The reading device 106 reads the data recorded on the portable recording medium 106a and transmits the data to the processor 101. Examples of the portable recording medium 106a include an optical disc, a magneto-optical disc, a semiconductor memory, and the like.

The communication interface 107 exchanges data with other devices via a network 107a. The communication interface 107 is, for example, an example of the reception unit 1a illustrated in FIG. 1.

The processing function of the hot proxy 100 is realized by the above configuration. The client device 50, the cold proxy 300, the account servers 210a, 210b, 210c, 410a, 410b, 410c, the container servers 220a, 220b, 220c, 420a, 420b, 420c, and the object servers 230a, 230b, 230c, 430a, 430b, 430c can also be realized as a computer having a hardware configuration as illustrated in FIG. 3.

Figure 4:
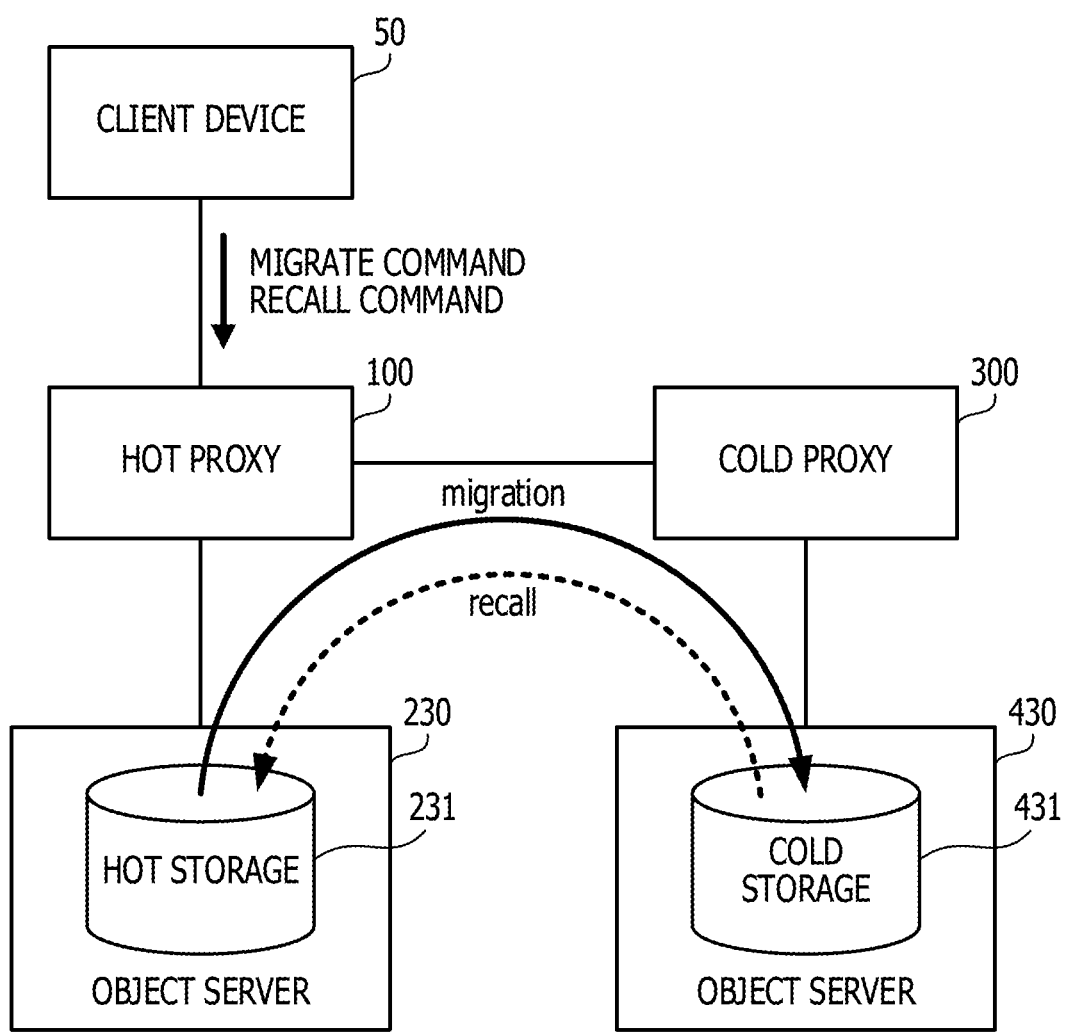
FIG. 4 is a diagram for describing data migration between storages.

FIG. 4 is a diagram for describing data migration between storages. As described above, the storages 431a, 431b, and 431c provided in the object servers 430a, 430b, and 430c have lower access speeds than the storages 231a, 231b, and 231c provided in the object servers 230a, 230b, and 230c. In the following description, the storages 231a, 231b, and 231c having high access speeds may be described as "hot storage". The storages 431a, 431b, 431c having low access speeds may be described as "cold storage".

The object server 230 illustrated in FIG. 4 is one of the object servers 230a, 230b, and 230c illustrated in FIG. 2 and includes a hot storage 231. The object server 430 illustrated in FIG. 4 is one of the object servers 430a, 430b, and 430c illustrated in FIG. 2 and includes a cold storage 431.

Then, as described above, in the storage system according to the present embodiment, storage tiering control can be performed. That is, it is possible to migrate data contained in the object between the hot storage 231 and the cold storage 431.

In the following description, data movement from the hot storage 231 to the cold storage 431 is described as "migration", and data movement in the opposite direction is described as "recall". The client device 50 may transmit a command "MIGRATE" for specifying an object and requesting execution of migration to the hot proxy 100. Furthermore, the client device 50 may also transmit a command "RECALL" for specifying an object and requesting execution of recall to the hot proxy 100.

Figure 5:
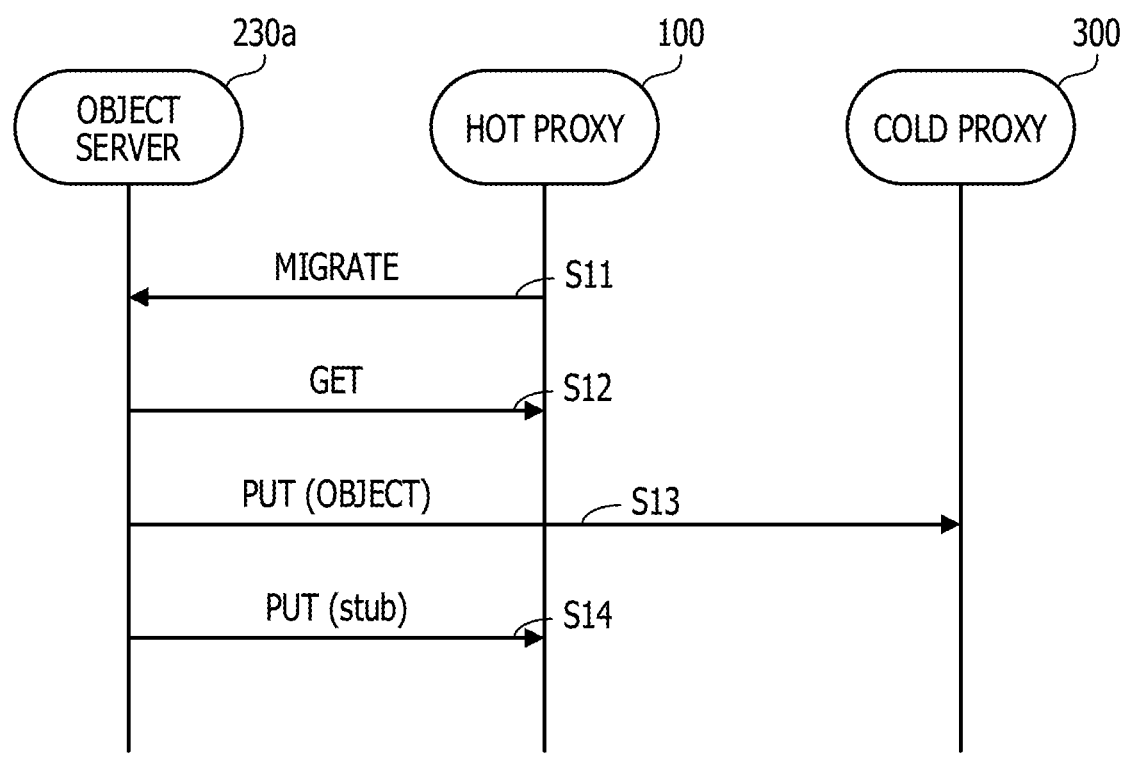
FIG. 5 is a diagram illustrating a comparative example of a processing procedure of migration.
Figure 6:
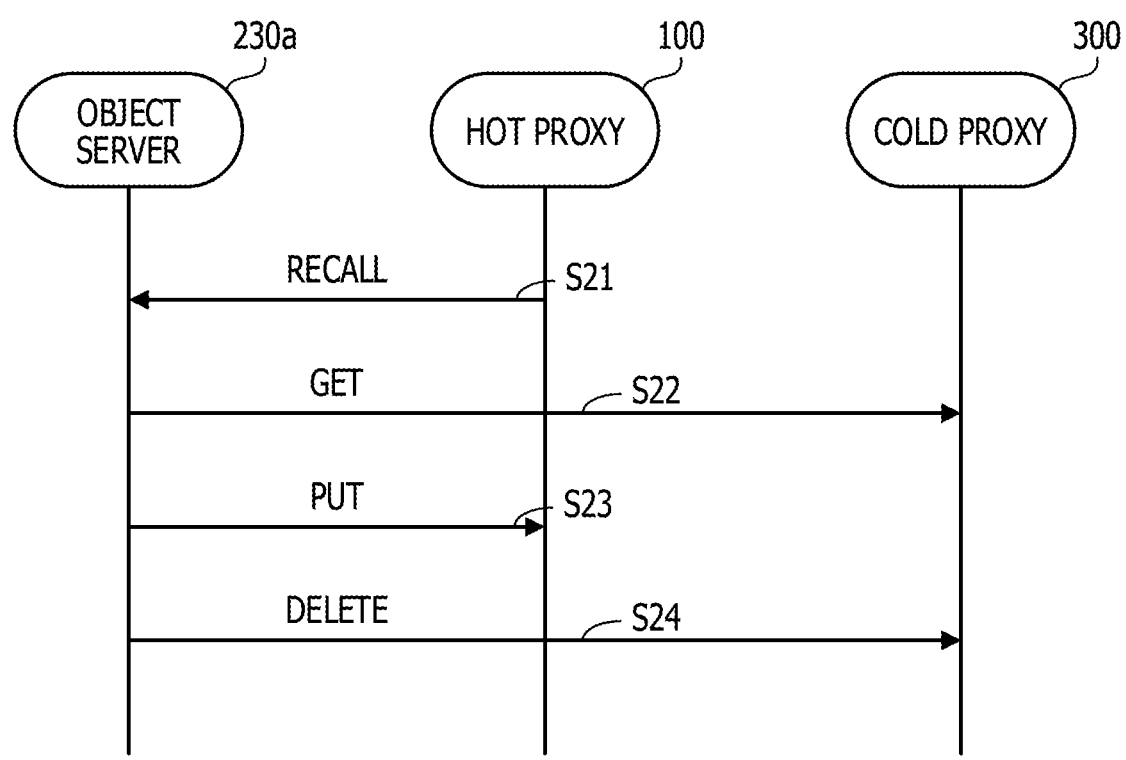
FIG. 6 is a diagram illustrating a comparative example of a processing procedure of recall.
Figure 7:
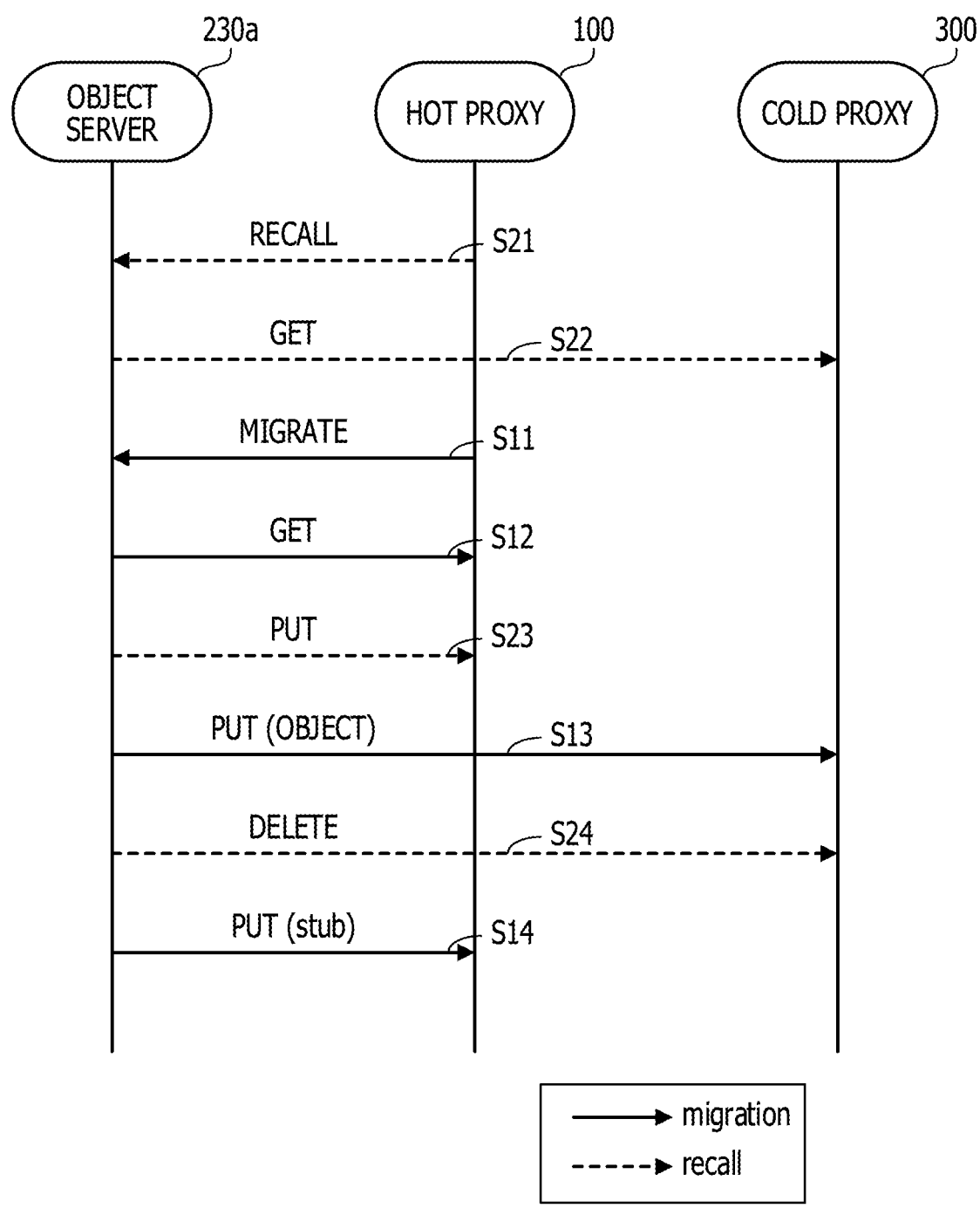
FIG. 7 is a diagram for describing problems in the comparative example.

Here, a comparative example of migration and recall is described using FIGS. 5 and 6, the problems in the comparative example are described by using FIG. 7, and then the description of the present embodiment will be continued from FIG. 8.

In the comparative example illustrated in FIGS. 5 and 6, migration and recall are controlled by the object server 230.

FIG. 5 is a diagram illustrating a comparative example of a processing procedure of migration.

Upon receiving a MIGRATE command for requesting execution of migration from the client device 50, the hot proxy 100 responds to the client device 50. Migration is relatively time consuming because the migration involves access to the cold storage 431 having a low access speed. Therefore, upon receiving the MIGRATE command, the hot proxy 100 immediately sends a migration completion notification back to the client device 50, and the subsequent processing is executed asynchronously.

After transmitting the migration completion notification, the hot proxy 100 transfers a MIGRATE command to any of the object servers 230a, 230b, and 230c (step S11). The object server that is a transfer destination is, for example, an object server determined in advance for migration control. Alternatively, the object server that is a transfer destination may be an object server determined from the URI of the object specified together with the MIGRATE command.

Here, it is assumed that a MIGRATE command has been transmitted to the object server 230a. The object server 230a separates a migration process requested to be executed into atomic processes such as a GET process and a PUT process and controls the processes. First, the object server 230*a* transmits a GET command for requesting execution of a GET process of an object from the hot storage 231 to the hot proxy 100 (step S12).

In response to the GET command, the hot proxy 100 reads data contained in the specified object from the object server 230 (any of the object servers 230*a*, 230*b*, and 230*c*) corresponding to the object. In the reading process, as described above, access to any one of the account servers 210*a*, 210*b*, and 210*c* and access to any one of the container servers 220*a*, 220*b*, and 220*c* are actually performed. The hot proxy 100 transmits the read data to the object server 230*a*.

Next, the object server 230*a* transmits a PUT command for requesting execution of a PUT process of the object to the cold storage 431 to the cold proxy 300 via the hot proxy 100 together with the received data (step S13).

In response to the PUT command, the cold proxy 300 transmits data to the object server 430 (one of the object servers 430*a*, 430*b*, and 430*c*) corresponding to the object and requests writing of the object. Also in the process of the write request, access to any of the account servers 410*a*, 410*b*, and 410*c* and access to any of the container servers 420*a*, 420*b*, and 420*c* are actually performed. When the writing is completed, the cold proxy 300 transmits a completion notification to the object server 230*a* via the hot proxy 100.

Finally, the object server 230*a* transmits a PUT command for requesting execution of a PUT process of "stub" to the hot proxy 100 (step S14). The stub is data indicating that the entity of the object is not stored in the hot storage 231 but is stored in the corresponding cold storage 431. In a case where a GET process of an object stored in the cold storage 431 is requested from the client device 50, the hot proxy 100 first accesses the object server 230 provided with the hot storage 231. At this time, since the stub corresponding to the object is recorded, the hot proxy 100 may recognize that the object is stored in the corresponding cold storage 431.

In response to the PUT command, the hot proxy 100 requests the object server 230 in which the object is stored to delete the entity of the object and write the stub. Also in the process of this request, access to any of the account servers 210*a*, 210*b*, and 210*c* and access to any of the container servers 220*a*, 220*b*, and 220*c* are actually performed. When the writing of the stub is completed, the hot proxy 100 transmits a completion notification to the object server 230*a*.

FIG. 6 is a diagram illustrating a comparative example of a processing procedure of recall.

The hot proxy 100 responds to the client device 50 immediately upon receiving from the client device 50 a RECALL command for requesting execution of recall. As with migration, a recall process is relatively time consuming. Therefore, upon receiving a RECALL command, the hot proxy 100 immediately sends a recall completion notification to the client device 50, and the subsequent processing is executed asynchronously.

After transmitting the recall completion notification, the hot proxy 100 transfers a RECALL command to any of the object servers 230*a*, 230*b*, and 230*c* (step S21). As in the case of migration, the object server that is a transfer destination is, for example, an object server determined in advance for recall control. Alternatively, the object server that is a transfer destination may be an object server determined from the URI of the object specified together with the RECALL command.

Here, it is assumed that a RECALL command has been transmitted to the object server 230*a*. As in the case of migration, the object server 230*a* separates and the recall process requested to be executed into atomic processes such as a GET process and a PUT process and controls the processes. First, the object server 230*a* transmits a GET command for requesting execution of a GET process of an object from the cold storage 431 to the cold proxy 300 via the hot proxy 100 (step S22).

In response to the GET command, the cold proxy 300 reads data contained in the specified object from the object server 430 (any of the object servers 430*a*, 430*b*, and 430*c*) corresponding to the object. Also in this read process, access to any of the account servers 410*a*, 410*b*, and 410*c* and access to any of the container servers 420*a*, 420*b*, and 420*c* are actually performed. The cold proxy 300 transmits the read data to the object server 230*a* via the hot proxy 100.

Next, the object server 230*a* transmits a PUT command for requesting execution of a PUT process of the object to the hot storage 231 to the hot proxy 100 together with the received data (step S23).

In response to the PUT command, the hot proxy 100 transmits data to the object server 230 (one of the object servers 230*a*, 230*b*, and 230*c*) corresponding to the object and requests writing of the object. Also in the process of the write request, access to any of the account servers 210*a*, 210*b*, and 210*c* and access to any of the container servers 220*a*, 220*b*, and 220*c* are actually performed.

When the writing of the writing is completed, the hot proxy 100 transmits a completion notification to the object server 230*a*.

Finally, the object server 230*a* transmits a DELETE command for deleting an object in the cold storage 431 to the cold proxy 300 via the hot proxy 100 (step S24).

The cold proxy 300 requests the object server 430 in which the object is stored to delete the object in response to the DELETE command. Also in the process of this request, access to any of the account servers 410*a*, 410*b*, and 410*c* and access to any of the container servers 420*a*, 420*b*, and 420*c* are actually performed. When the object deletion is completed, the cold proxy 300 transmits a completion notification to the object server 230*a* via the hot proxy 100.

By the way, as illustrated in FIG. 5, in the migration process, access to the cold storage 431 with a low access speed is included once in step S13. On the other hand, as illustrated in FIG. 6, in the recall process, access to the cold storage 431 is included twice in steps S22 and S24. For this reason, the time from the start to the completion of the recall is longer than the time from the start to the completion of migration.

In a case where the processing procedures illustrated in FIGS. 5 and 6 are used, if, execution of migration of the same object is requested immediately after the execution of the recall is requested due to these differences in processing times, there is a problem that an object may be deleted accidentally.

FIG. 7 is a diagram for describing problems in the comparative example. This FIG. 7 illustrates an example of the progress of the process in a case where execution of migration of the same object is requested immediately after execution of recall is requested. The processes included in the recall have the same step numbers as in FIG. 6, and the processes included in the migration have the same step numbers as in FIG. 5. Similar to FIG. 6, recall is controlled by the object server 230a, and similar to FIG. 5, migration is also controlled by the object server 230a.

Recall is requested in a case where the frequency of access to the object is high, and migration is requested in a case where the frequency of access to the object is low. For this reason, normally, execution of migration of the same object is not requested immediately after the execution of recall is requested. However, for example, in a case where the client device 50 executes an erroneous process, or in a case where a plurality of client devices 50 are connected to the hot proxy 100 and a recall request and a migration request are issued from separate client devices 50, the above events can occur.

In FIG. 7, for example, it is assumed that a MIGRATE command is issued from the client device 50 after the object server 230a transmits a GET command to the cold proxy 300 in response to a RECALL command (step S22). Here, since the GET process in step S22 includes access to the cold storage 431 with a low access speed, it takes time to complete the process. For this reason, there is a possibility that the processes included in the migration may advance one after another between the transmission of the GET command in step S22 and the reception of the response.

In the example of FIG. 7, it is assumed that the reception of the MIGRATE command included in the migration (step S11) and the transmission of the GET command (step S12) are completed between the transmission of the GET command in step S22 and the reception of the response.

In this case, the object server 230a transmits a PUT command for data acquired from the cold storage 431 (step S23) and transmits a PUT command included in the migration (step S13). Furthermore, since the processing time of step S23 is shorter than that of step S13, the object server 230a executes transmission of the DELETE command included in the recall (step S24).

In a case where the process progresses in this way, the transmission (step S13) of the PUT command included in the migration that is requested to be executed will be executed earlier than the transmission (step S24) of the DELETE command that is included in the recall that is requested to be executed first. In this case, the data stored in the cold storage 431 by the process of step S13 is accidentally deleted by the process of step S24.

In this way, in a case where recall and migration for the same object are requested at a similar time, there is a possibility that transmission of the PUT command included in the migration and transmission of the DELETE command included in the recall will be reversed. In this case, there is a problem that an object is lost unintentionally.

To address such problems, in the present embodiment, migration and recall are controlled by the hot proxy 100 first. Thus, the hot proxy 100 may integrally manage whether or not migration or recall is in progress.

Then, when execution of recall or migration is requested, the hot proxy 100 determines whether or not migration or recall for the same object is in progress. If migration or recall is being executed, the hot proxy 100 cancels the process that is meaningless to execute among the process requested to be executed and the process being executed. Thus, migration and recall are suppressed from being executed in parallel, and as a result, the occurrence of erroneous deletion of data as described above is avoided.

FIG. 8 is a diagram illustrating an example of a control pattern according to a combination of processing. The hot proxy 100 performs control by using three types of control patterns P1, P2-1, and P2-2 as illustrated in the correspondence table 500 of FIG. 8 depending on the combination of previously requested and subsequently requested processes for the same object. Although the control patterns P2-1 and P2-2 are the same as the control content, the reason is different, and different pattern numbers are given and illustrated.

The control pattern P1 is used in a case where the previously requested process becomes meaningless due to the execution of the subsequently requested process. Therefore, in the control pattern P1, when the subsequent process is executed, the process requested earlier and currently executed is stopped, and only the subsequently requested process is executed.

For example, as illustrated in FIG. 8, the control pattern P1 is applied to a combination in which a previously requested process is recall and a subsequently requested process is migration. This combination is a combination that can cause the problem illustrated in FIG. 7. In this combination, data migrated from the cold storage 431 to the hot storage 231 by recall is returned to the cold storage 431 by migration. Therefore, the processing result does not change even if the execution of the recall is canceled. Therefore, it is possible to suppress the accidental deletion of data to be stored in the cold storage 431 by stopping execution of the recall and executing only migration.

The control pattern P1 is also applied to the following combinations. In the case of the following combinations, the processing load on the devices in the storage system such as the hot proxy 100 and the communication load between the devices can be reduced by stopping the execution of the previously requested process that was a wasted process. It is possible to avoid the occurrence of an error due to execution of different processes on the same object.

For example, the control pattern P1 is applied to a combination in which the previously requested process is migration and the subsequently requested process is recall. In this combination, data migrated from the hot storage 231 to the cold storage 431 by migration is returned to the hot storage 231 by recall. Therefore, the processing result does not change even if the execution of the migration is stopped.

The control pattern P1 is also applied to a combination in which the previously requested process is migration or recall, and the subsequently requested process is a PUT process (but data update). Since the fact that a PUT process is requested means that the object is presumed to be a frequently accessed object, data is stored in the hot storage 231 by a PUT process. Therefore, the previously requested migration or recall does not have to be executed.

Next, the control pattern P2-1 is used in a case where the substantial processing is not executed even if the subsequently requested process is performed. Therefore, in the control pattern P2-1, the execution of the previously requested process is continued, and the execution of the subsequently requested process is cancelled. Thus, the processing load on the devices in the storage system such as the hot proxy 100 and the communication load between the devices may be reduced. It is possible to avoid the occurrence of an error due to execution of different processes on the same object.

For example, in a case where the previously requested process and the subsequently requested process are the same (migration or recall), the control pattern P2-1 is applied. Furthermore, the control pattern P2-1 is applied to a combination in which a previously requested process is a PUT process and a subsequently requested process is recall. This is because, in the PUT process, data is written to the hot storage 231 as in the case of recall.

Next, the control pattern P2-2 is applied to a combination in which a previously requested process is a PUT process and a subsequently requested process is migration. Migration is request for objects that have not been accessed for a long time, while objects for which a PUT process has been requested are presumed to be accessed frequently. In this combination, the execution of the migration is canceled so that the object is stored in the hot storage 231 and the data can be read quickly when the object is accessed again.

Next, details of processing in the storage system according to the present embodiment will be described.

Figure 9:
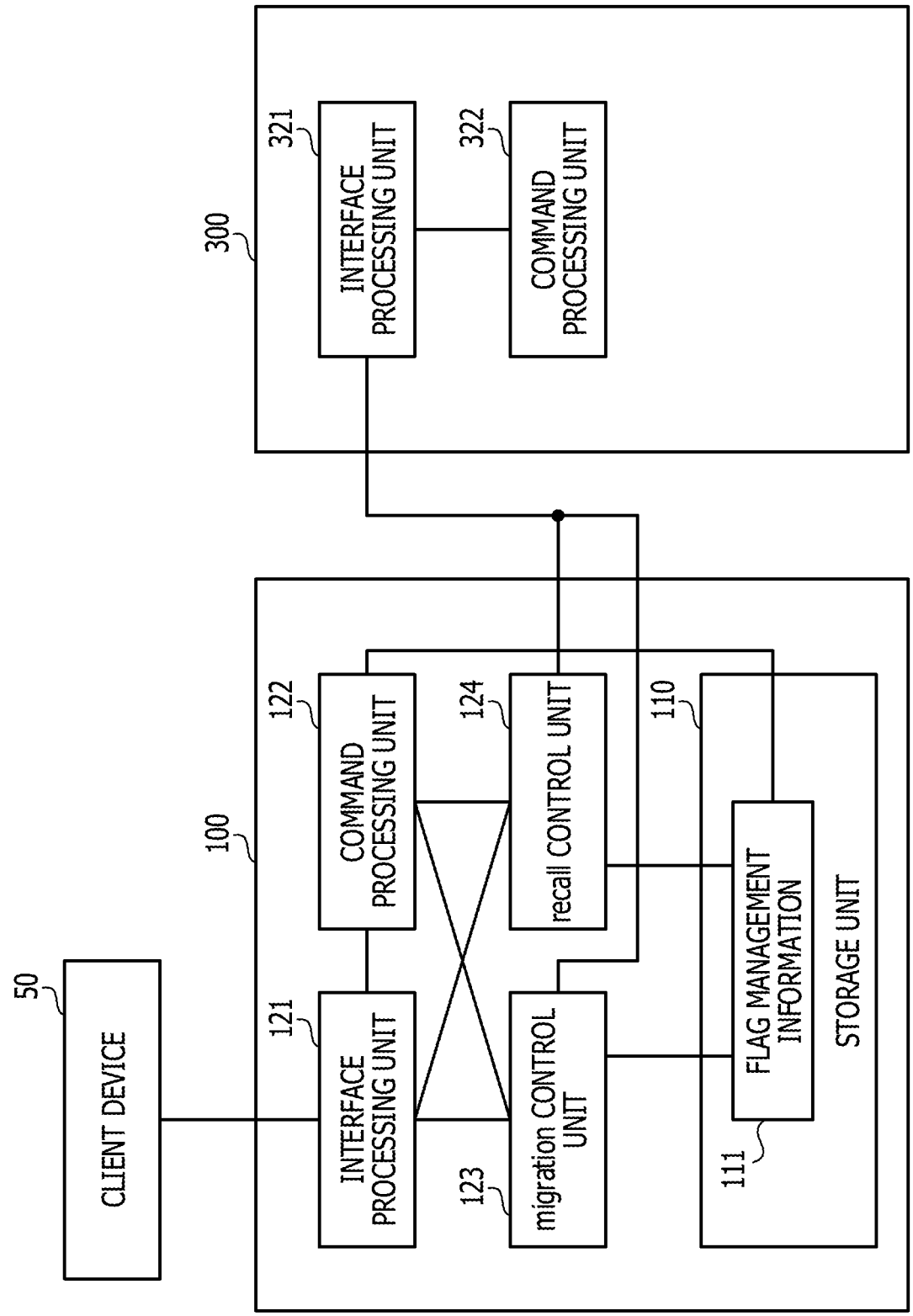
FIG. 9 is a block diagram illustrating an example of a configuration of processing functions provided in the hot proxy and a cold proxy.

First, FIG. 9 is a block diagram illustrating an example of a configuration of processing functions provided in the hot proxy and a cold proxy.

The hot proxy 100 includes a storage unit 110, an interface processing unit 121, a command processing unit 122, a migration control unit 123, and a recall control unit 124. The storage unit 110 is realized as a storage area of a storage device provided in the hot proxy 100, such as the RAM 102, for example. The processing of the interface processing unit 121, the command processing unit 122, the migration control unit 123, and the recall control unit 124 is realized, for example, by the processor 101 executing a predetermined application program.

The storage unit 110 stores flag management information 111.

The flag management information 111 holds information indicating for each object whether or not a PUT process, migration, and recall are being executed.

The interface processing unit 121 executes interface processing with the client device 50. The interface processing unit 121 receives a command from the client device 50, outputs the received command to any of the command processing unit 122, the migration control unit 123, and the recall control unit 124, and executes processing in accordance with the command.

The command processing unit 122 executes processing in accordance with the command received from the interface processing unit 121, the migration control unit 123, and the recall control unit 124. The commands received by the command processing unit 122 are commands for executing atomic processes, such as a GET command, a PUT command, and a DELETE command.

The migration control unit 123 receives a MIGRATE command from the interface processing unit 121 and issues a command to the command processing unit 122 or the cold proxy 300 to execute migration.

The recall control unit 124 receives a RECALL command from the interface processing unit 121 and issues a command to the command processing unit 122 or the cold proxy 300 to execute recall.

On the other hand, the cold proxy 300 includes an interface processing unit 321 and a command processing unit 322. The processing of the interface processing unit 321 and the command processing unit 322 is realized, for example, by a processor of the cold proxy 300 executing a predetermined application program.

The interface processing unit 321 executes interface processing with the hot proxy 100. The interface processing unit 321 receives a command from the migration control unit 123 or the recall control unit 124 of the hot proxy 100, outputs the received command to the command processing unit 322, and executes processing in accordance with the command.

The command processing unit 322 executes processing in accordance with the command received from the interface processing unit 321. The commands received by the command processing unit 322 are commands for executing atomic processes, such as a GET command, a PUT command, and a DELETE command.

Figure 10:
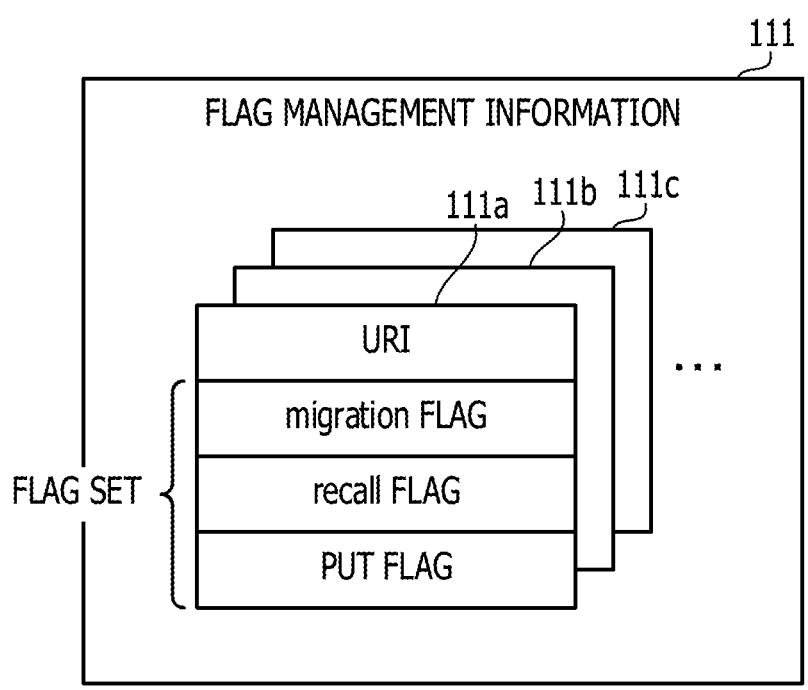
FIG. 10 is a diagram illustrating an example of a data configuration of flag management information.

FIG. 10 is a diagram illustrating an example of a data configuration of flag management information. The flag management information 111 has records 111*a*, 111*b*, 111*c*, . . . for each object. In each record, the URI of an object and a flag set corresponding to the object are registered.

The flag set includes a migration flag, a recall flag, and a PUT flag.

The migration flag indicates whether migration for the corresponding object is in progress. The recall flag indicates whether recall for the corresponding object is in progress. The PUT flag indicates whether a PUT process (however, data update) for the corresponding object is in progress. The migration flag, the recall flag, and the PUT flag are all set to "1" in a case where the processes are being executed, and are set to "0" in a case where the processes are not being executed.

Next, the process of the hot proxy 100 will be described by using a flowchart.

Figure 11:
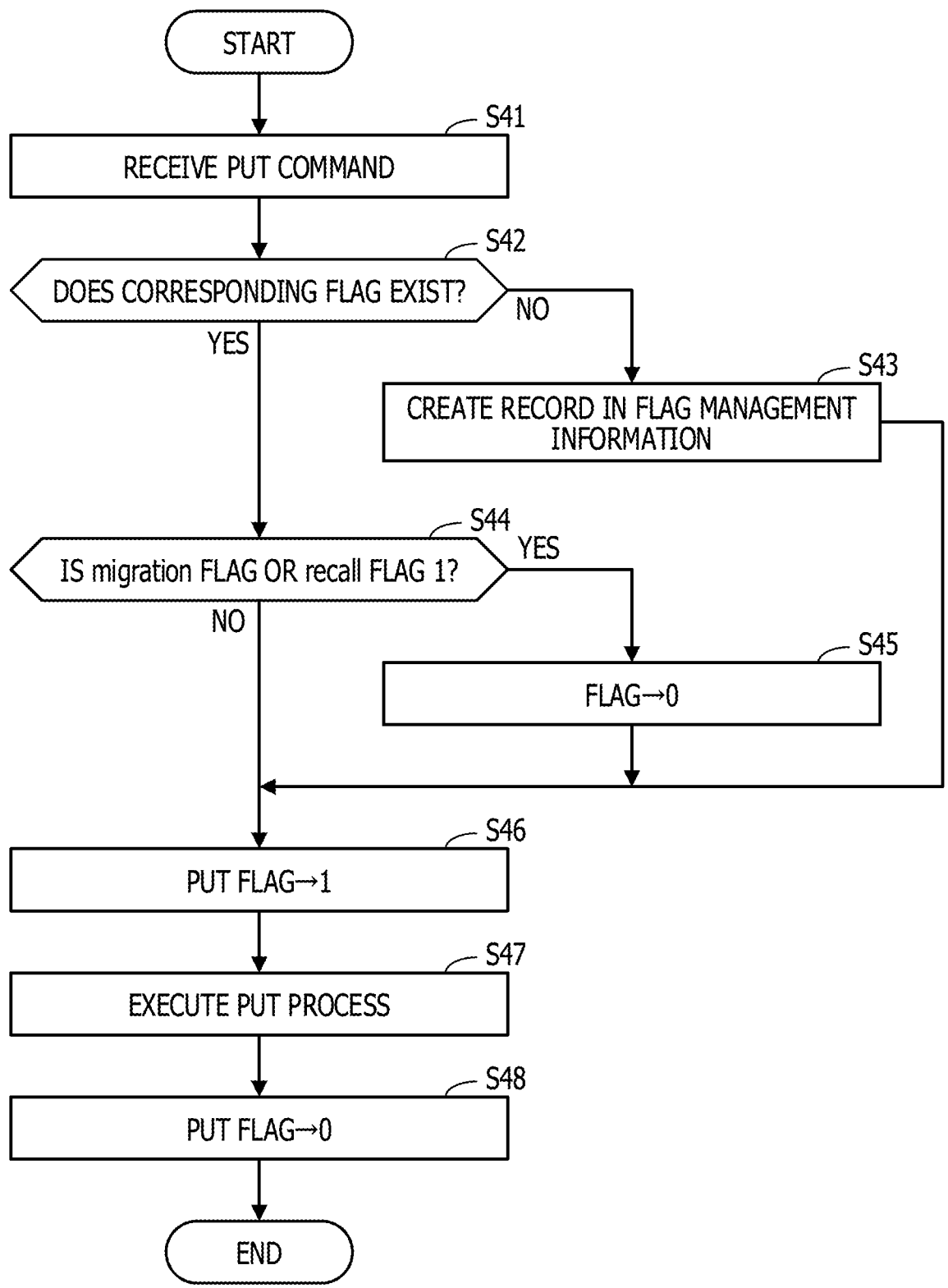
FIG. 11 is a flowchart illustrating an example of a processing procedure of the hot proxy in a case where a PUT process is requested.

First, FIG. 11 is a flowchart illustrating an example of a processing procedure of the hot proxy in a case where a PUT process is requested.

<Step S41>

When the interface processing unit 121 receives a PUT command from the client device 50, the interface processing unit 121 outputs the received PUT command to the command processing unit 122.

<Step S42>

The command processing unit 122 determines whether a flag set corresponding to an object specified as a target of a PUT process exists in the flag management information 111. In a case where the record corresponding to the object specified as the target of a PUT process is registered in the flag management information 111, it is determined that the corresponding flag set exists.

In the case of determining that the corresponding flag set exists, the command processing unit 122 executes the process of step S44. This case is a case where updating of data contained in an object is requested. On the other hand, in the case of determining that the corresponding flag set does not exist, the command processing unit 122 executes the process of step S43.

<Step S43>

The command processing unit 122 adds the record corresponding to the object specified as the target of the PUT process to the flag management information 111. At this time, the command processing unit 122 sets "0" as an initial value to all the flags in the added record.

<Step S44>

The command processing unit 122 confirms the migration flag and the recall flag registered in the corresponding record of the flag management information 111. In a case where at least one of the migration flag and the recall flag is "1", the command processing unit 122 executes the process of step S45. On the other hand, in a case where both the migration flag and the recall flag are "0", the command processing unit 122 executes the process of step S46.

<Step S45>

The command processing unit 122 updates the flag in which "1" is set among the flags confirmed in step S44 to "0".

Here, in a case where the migration flag is "1" in step S44, migration of the same object is in progress. In this case, the control pattern P1 illustrated in FIG. 8 is applied, and the execution of the migration is stopped halfway, and therefore, the command processing unit 122 updates the migration flag to "0".

In a case where the recall flag is "1" at step S44, it indicates that recall for the same object is being executed.

Also in this case, since the control pattern P1 illustrated in FIG. 8 is applied and the execution of the recall is stopped halfway, the command processing unit 122 updates the recall flag to "0".

The migration flag may be updated to "0" by the migration control unit 123 when stopping the execution of the migration. Similarly, the recall control unit 124 may update the recall flag to "0" when canceling the execution of the recall.

<Step S46>

The command processing unit 122 updates the PUT flag registered in the corresponding record of the flag management information 111 to "1".

<Step S47>

The command processing unit 122 executes a PUT process for the specified object. In this process, as described above, access to any of the account servers 210a, 210b, and 210c and access to any of the container servers 220a, 220b, and 220c are performed. Then, the data contained in the object is written to any one of the object servers 230a, 230b, and 230c.

<Step S48>

The command processing unit 122 updates the PUT flag registered in the corresponding record of the flag management information 111 to "0". Then, the command processing unit 122 transmits a completion notification of the PUT process to the client device 50.

Figure 12:
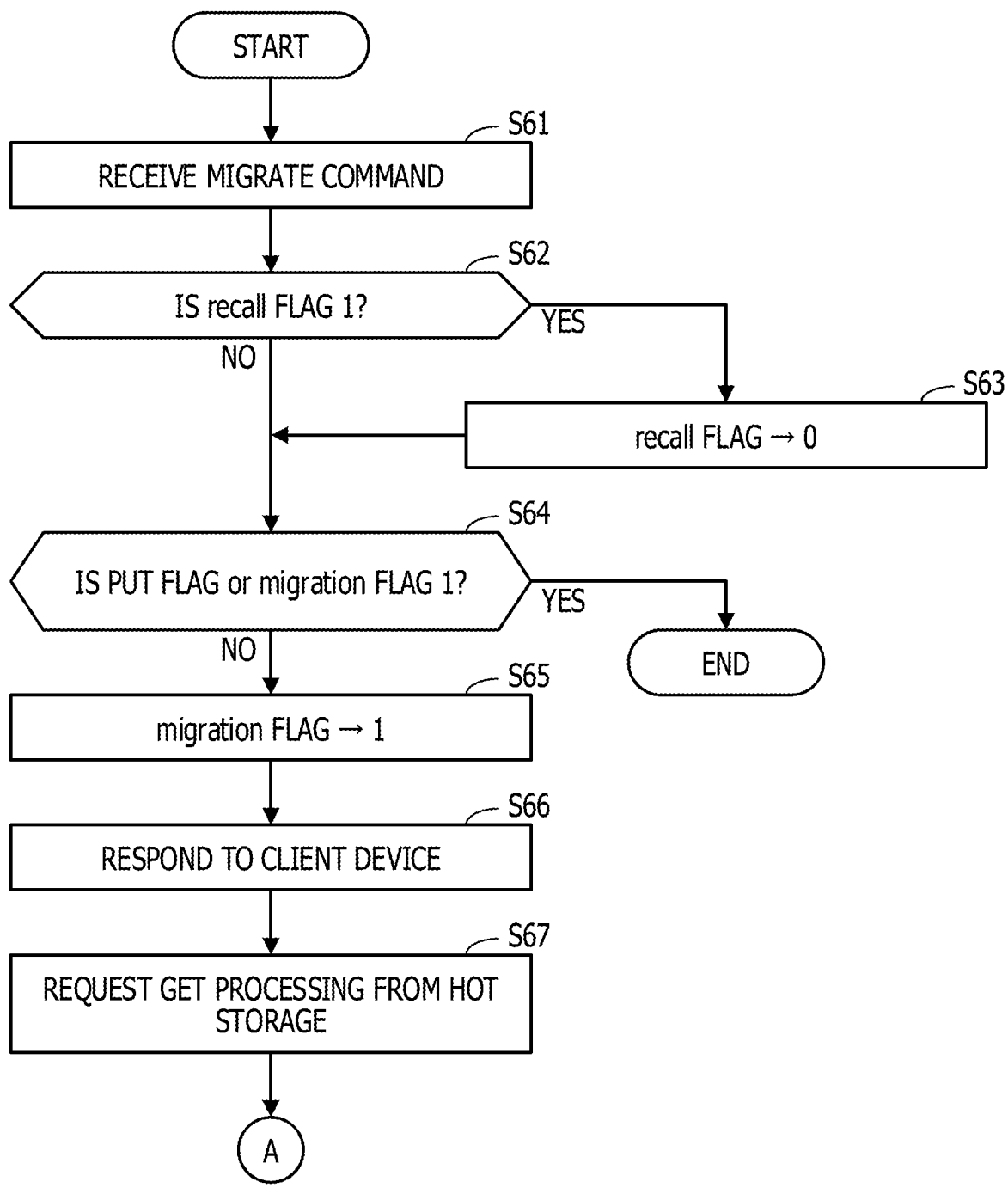
FIG. 12 is a flowchart (No. 1) illustrating an example of the processing procedure of the hot proxy when migration is requested.
Figure 13:
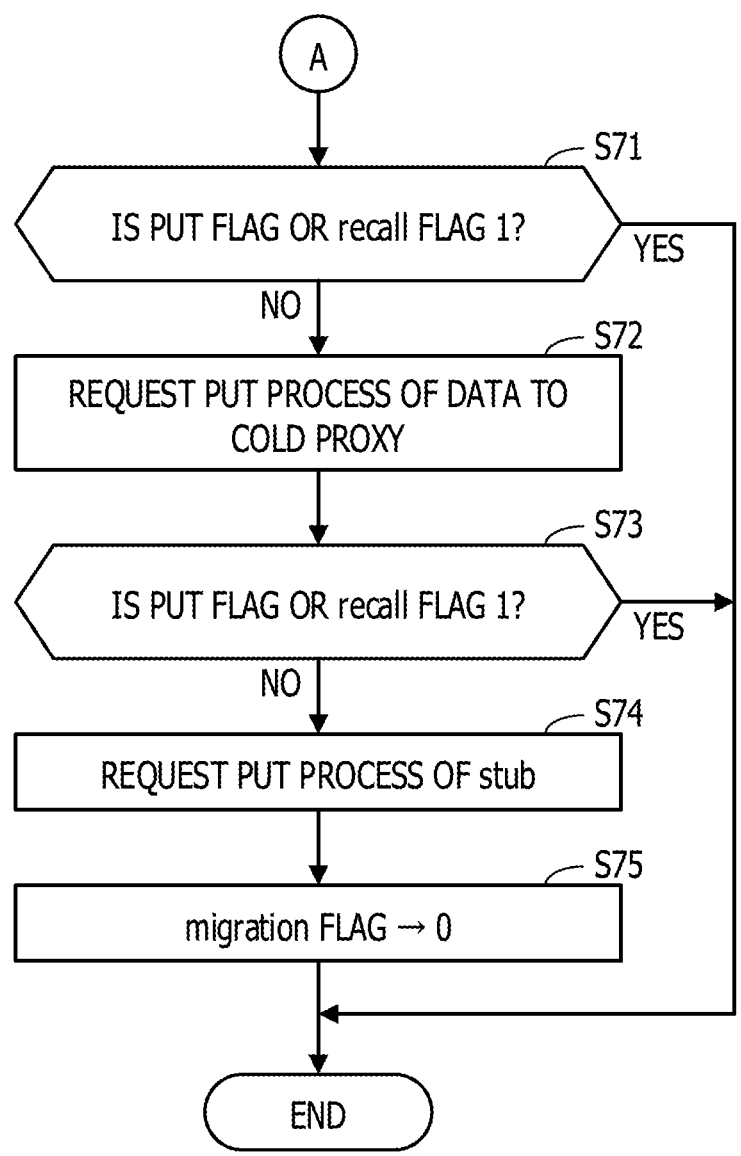
FIG. 13 is a flowchart (No. 2) illustrating an example of the processing procedure of the hot proxy when migration is requested.

FIGS. 12 and 13 are flowcharts illustrating an example of the processing procedure of the hot proxy when migration is requested.

<Step S61>

When receiving a MIGRATE command from the client device 50, the interface processing unit 121 outputs the received MIGRATE command to the migration control unit 123.

<Step S62>

The migration control unit 123 identifies a record corresponding to an object specified as a migration target from the flag management information 111. The migration control unit 123 executes the process of step S63 in a case where the recall flag registered in the identified record is "1" and executes the process of step S64 in a case where the recall flag is "0".

<Step S63>

In a case where the recall flag is "1" at step S62, recall for the same object is in progress. In this case, the control pattern P1 illustrated in FIG. 8 is applied, and the execution of the recall is stopped halfway. Therefore, the migration control unit 123 updates the recall flag referred to in step S62 to "0".

The recall control unit 124 may update the recall flag to "0" when canceling the execution of the recall.

<Step S64>

The migration control unit 123 confirms the PUT flag and the migration flag registered in the record identified in step S62. In a case where the PUT flag is "1", a PUT process for the same object is in progress, and in this case, the control pattern P2-2 illustrated in FIG. 8 is applied. In a case where the migration flag is "1", migration for the same object is in progress, and in this case, the control pattern P2-1 illustrated in FIG. 8 is applied.

Therefore, in a case where at least one of the PUT flag and the migration flag is "1", the migration control unit 123 cancels the execution of the migration process requested to be executed in step S61. On the other hand, in a case where the PUT flag and the migration flag are both "0", the migration control unit 123 executes the process of step S65.

<Step S65>

The migration control unit 123 updates the migration flag registered in the record identified in step S62 to "1".

<Step S66>

The migration control unit 123 transmits a migration completion notification to the client device 50 via the interface processing unit 121 and responds to the client device 50.

<Step S67>

The migration control unit 123 outputs a GET command for requesting a GET process of data from the hot storage 231 for the specified object to the command processing unit 122. The command processing unit 122 reads data included in the corresponding object from any one of the object servers 230a, 230b, and 230c and outputs the data to the migration control unit 123. In the actual processing of the command processing unit 122, as described above, access to any of the account servers 210a, 210b, and 210c and access to any of the container servers 220a, 220b, and 220c are performed. Thereafter, data is read from any of the object servers 230a, 230b, and 230c.

Thereafter, the process of step S71 of FIG. 13 is executed.

<Step S71>

The migration control unit 123 confirms the PUT flag and the recall flag registered in the record identified in step S62. In a case where the PUT flag is "1", execution of the PUT process for the same object is started later. In a case where the recall flag is "1", the execution of recall for the same object is started later. In any of these cases, the control pattern P1 illustrated in FIG. 8 is applied.

Therefore, in a case where at least one of the PUT flag and the recall flag is "1", the migration control unit 123 cancels the execution of the migration. On the other hand, in a case where both the PUT flag and the recall flag are "0", the migration control unit 123 executes the process of step S72.

<Step S72>

The migration control unit 123 transmits a PUT command for requesting a PUT process of data to the cold storage 431 for the specified object to the cold proxy 300.

The interface processing unit 321 of the cold proxy 300 receives the transmitted PUT command and outputs the command to the command processing unit 322, and the command processing unit 322 executes a PUT process of data to the cold storage 431. The command processing unit 322 performs access to any of the account servers 410a, 410b, and 410c and access to any of the container servers 420a, 420b, and 420c. Then, the command processing unit 322 requests the object server in which the corresponding object is stored among the object servers 430a, 430b, and 430c to write data to the object.

When the writing of the data is completed and a response is returned from the command processing unit 322 to the hot proxy 100 via the interface processing unit 321, the process of step S73 is executed.

<Step S73>

In this process, the same process is executed for the same reason as step S71. That is, the migration control unit 123 confirms the PUT flag and the recall flag registered in the record identified in step S62. In a case where at least one of the PUT flag and the recall flag is "1", the migration control unit 123 cancels the execution of the migration.

On the other hand, in a case where both the PUT flag and the recall flag are "0", the migration control unit 123 executes the process of step S74.

<Step S74>

The migration control unit 123 outputs a PUT command for requesting a PUT process of stub for an object stored in the hot storage 231 to the command processing unit 122. The command processing unit 122 performs access to any of the account servers 210*a*, 210*b*, and 210*c* and access to any of the container servers 220*a*, 220*b*, and 220*c*. Then, the command processing unit 122 requests the object server in which the corresponding object is stored among the object servers 230*a*, 230*b*, and 230*c* to write the stub corresponding to the object. Thus, at least data contained in the object is deleted from the hot storage 231.

<Step S75>

The migration control unit 123 updates the migration flag registered in the record identified in step S62 to "0".

Figure 14:
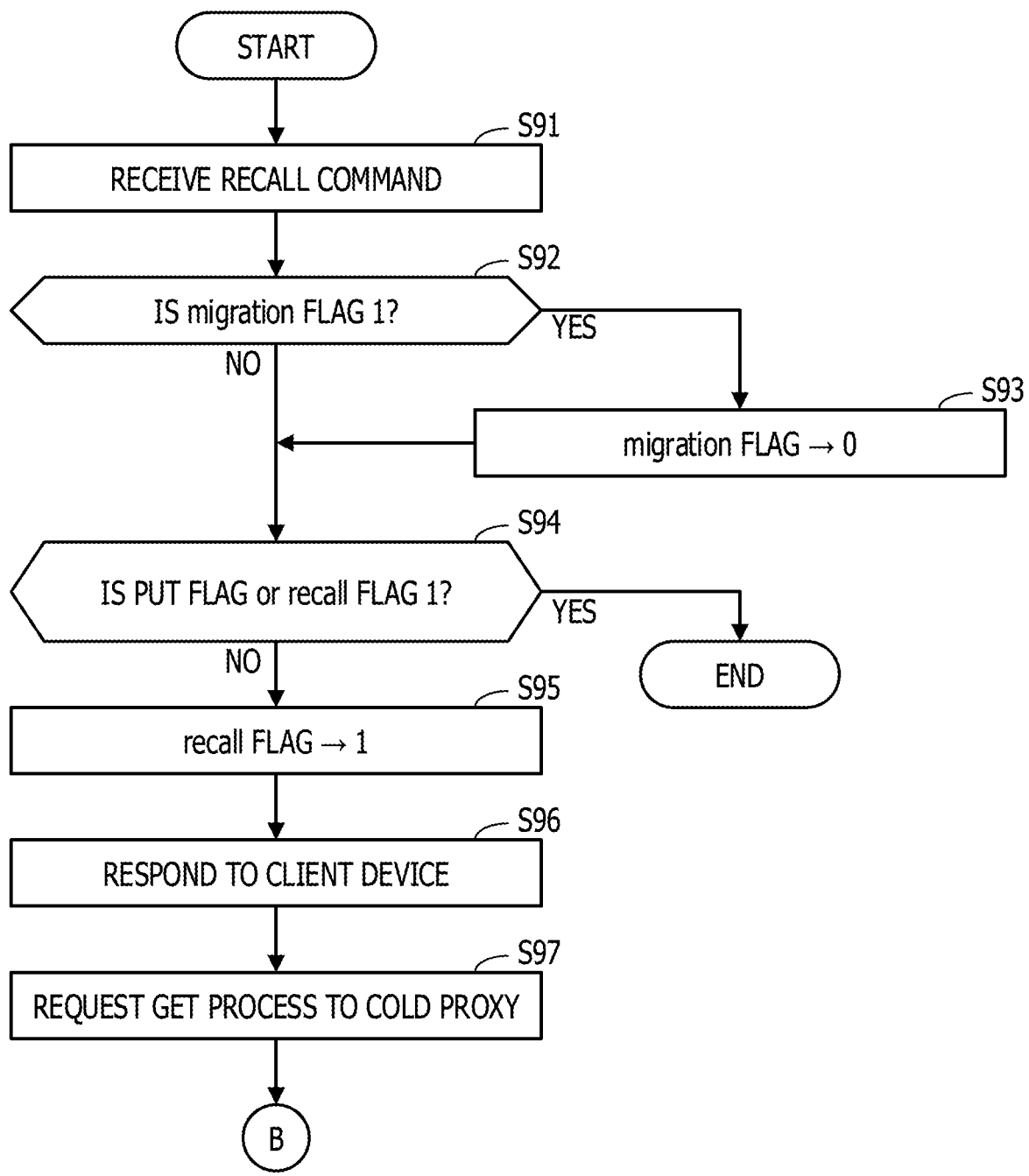
FIG. 14 is a flowchart (No. 1) illustrating an example of the processing procedure of the hot proxy when recall is requested.
Figure 15:
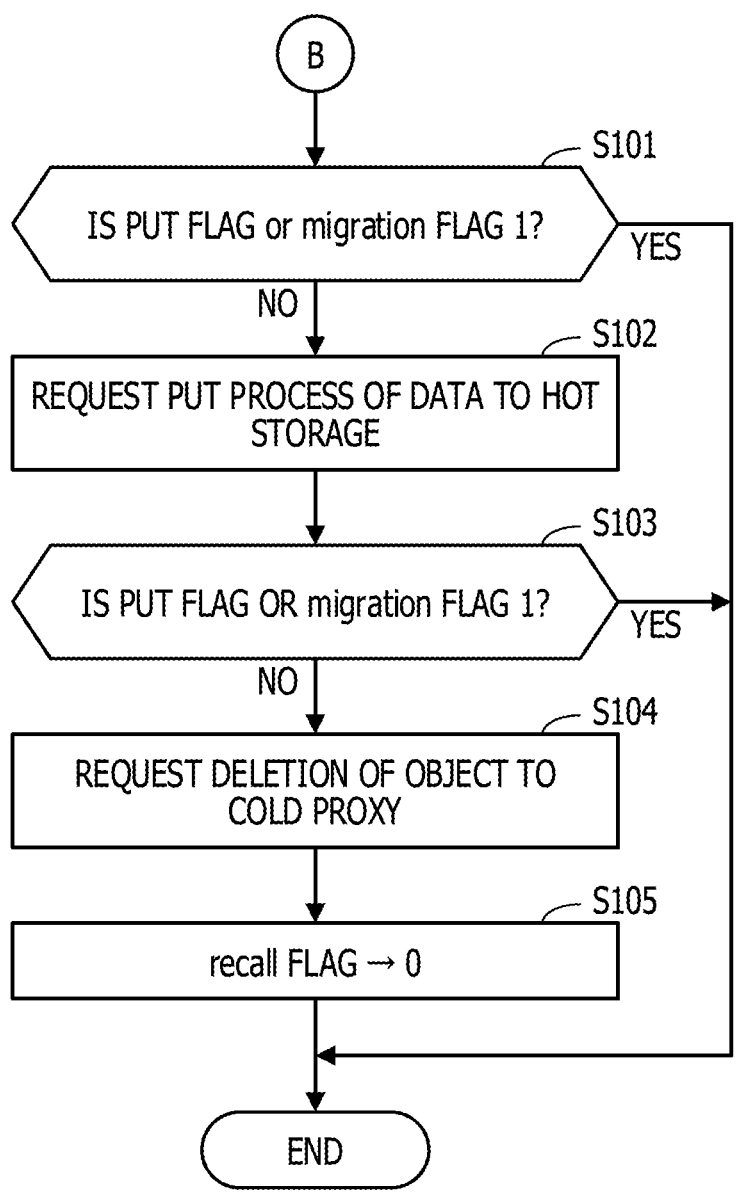
FIG. 15 is a flowchart (No. 2) illustrating an example of the processing procedure of the hot proxy when recall is requested.

FIGS. 14 and 15 are flowcharts illustrating an example of the processing procedure of the hot proxy in a case where recall is requested.

<Step S91>

When receiving a RECALL command from the client device 50, the interface processing unit 121 outputs the received RECALL command to the recall control unit 124.

<Step S92>

The recall control unit 124 identifies the record corresponding to the object specified as a target of the recall from the flag management information 111. The recall control unit 124 executes the process of step S93 in a case where the migration flag registered in the identified record is "1", and executes the process of step S94 in a case where the migration flag is "0".

<Step S93>

In a case where the migration flag is "1" in step S92, migration of the same object is in progress. In this case, the control pattern P1 illustrated in FIG. 8 is applied, and the execution of the migration is stopped halfway. Therefore, the recall control unit 124 updates the migration flag referred to in step S92 to "0".

<Step S94>

The migration flag may be updated to "0" by the migration control unit 123 when stopping the execution of the migration.

<Step S94>

The recall control unit 124 confirms the PUT flag and the recall flag registered in the record identified in step S92. In a case where the PUT flag is "1", a PUT process for the same object is in progress. In a case where the recall flag is "1", recall for the same object is in progress. In any of these cases, the control pattern P2-1 illustrated in FIG. 8 is applied.

Therefore, in a case where at least one of the PUT flag and the recall flag is "1", the recall control unit 124 stops the execution of the recall process requested to be executed in step S91. On the other hand, in a case where both the PUT flag and the recall flag are "0", the recall control unit 124 executes the process of step S95.

<Step S95>

The recall control unit 124 updates the recall flag registered in the record identified in step S92 to "1".

<Step S96>

The recall control unit 124 transmits a recall completion notification to the client device 50 via the interface processing unit 121 and responds to the client device 50.

<Step S97>

The recall control unit 124 transmits a GET command for requesting a GET process from the cold storage 431 for the specified object to the cold proxy 300.

The interface processing unit 321 of the cold proxy 300 receives the transmitted GET command and outputs the command to the command processing unit 322, and the command processing unit 322 executes a GET process of data from the cold storage 431. The command processing unit 322 actually performs access to any of the account servers 410*a*, 410*b*, and 410*c* and access to any of the container servers 420*a*, 420*b*, and 420*c*. Then, the command processing unit 322 requests the object server in which the corresponding object is stored among the object servers 430*a*, 430*b*, and 430*c* to read the data included in the object.

The command processing unit 322 transmits the read data to the hot proxy 100 via the interface processing unit 321. When the transmitted data is received by the recall control unit 124 of the hot proxy 100, the process of step S101 of FIG. 15 is executed.

<Step S101>

The recall control unit 124 confirms the PUT flag and the migration flag registered in the record identified in step S92. In a case where the PUT flag is "1", execution of the PUT process for the same object is started later. If the migration flag is "1", execution of migration for the same object is started later. In any of these cases, the control pattern P1 illustrated in FIG. 8 is applied.

Therefore, in a case where at least one of the PUT flag and the migration flag is "1", the recall control unit 124 stops the execution of the recall. On the other hand, in a case where both the PUT flag and the migration flag are "0", the recall control unit 124 executes the process of step S102.

<Step S102>

The recall control unit 124 outputs a PUT command for requesting a PUT process of data to the hot storage 231 for the specified object, to the command processing unit 122. The command processing unit 122 requests the object server in which the corresponding object is stored among the object servers 230*a*, 230*b* and 230*c* to write data to the object. In the actual processing of the command processing unit 122, as described above, access to any of the account servers 210*a*, 210*b*, and 210*c* and access to any of the container servers 220*a*, 220*b*, and 220*c* are performed. Then, writing of data is requested to one of the object servers 230*a*, 230*b*, and 230*c*.

When the writing of data is completed, the process of step S103 is executed.

<Step S103>

In this process, the same process is executed for the same reason as step S101. That is, the recall control unit 124 confirms the PUT flag and the migration flag registered in the record identified in step S92. In a case where at least one of the PUT flag and the migration flag is "1", the recall control unit 124 stops the execution of the recall. On the other hand, in a case where both the PUT flag and the migration flag are "0", the recall control unit 124 executes the process of step S104.

<Step S104>

The recall control unit 124 transmits a DELETE command for requesting deletion of an object stored in the cold storage 431 to the cold proxy 300.

The interface processing unit 321 of the cold proxy 300 receives the sent DELETE command and outputs the command to the command processing unit 322, and the command processing unit 322 executes deletion processing of the object stored in the cold storage 431. The command processing unit 322 actually performs access to any of the account servers 410a, 410b, and 410c and access to any of the container servers 420a, 420b, and 420c. Then, the command processing unit 322 requests the object server in which the corresponding object is stored among the object servers 430a, 430b, and 430c to delete the object.

When the deletion of the object is completed and a response is returned from the command processing unit 322 to the hot proxy 100 via the interface processing unit 321, the process of step S105 is executed.

<Step S105>

The recall control unit 124 updates the recall flag registered in the record identified in step S92 to "0".

By the processes described above with reference to FIGS. 11 to 15, as illustrated in FIG. 8, the process to which the control pattern according to the combination of processes is applied is executed. Thus, the process that is meaningless to be executed is canceled out of the process requested to be executed and the process being executed for the same data. Therefore, migration and recall for the same data are not executed in parallel, and as a result, it is possible to avoid the occurrence of data being accidentally deleted. Execution of only meaningful processes can reduce the processing load on devices in the storage system such as the hot proxy 100 and the communication load between the devices.

Third Embodiment

In the second embodiment described above, the hot proxy 100 holds a flag set indicating whether a PUT process, migration and recall are being executed. However, the flag set may be stored in the same object server storage (hot storage) as the corresponding object. The third embodiment in which the second embodiment is thus modified will be described below.

Figure 16:
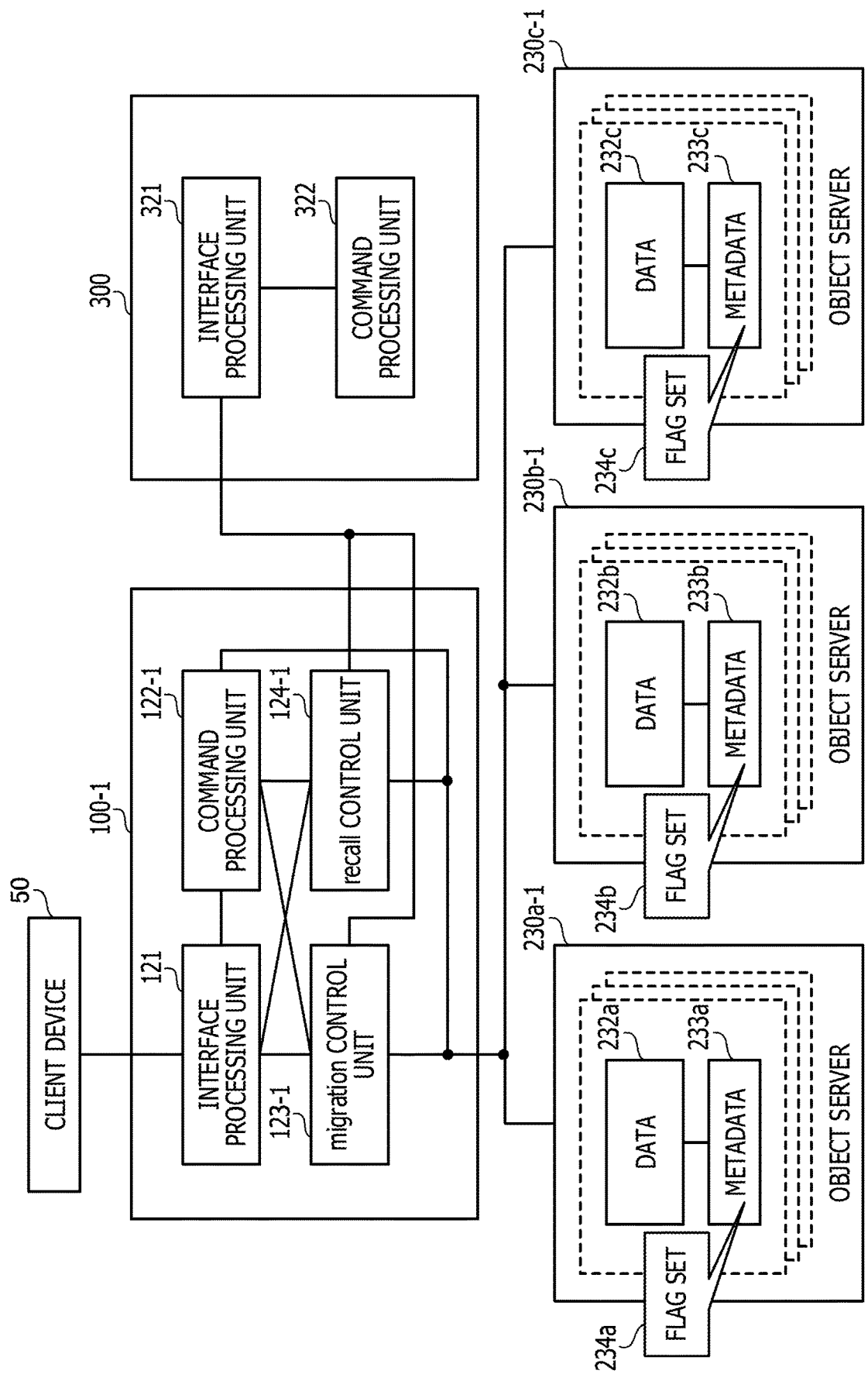
FIG. 16 is a block diagram illustrating an example of a configuration of processing functions provided in each device of a storage system according to a third embodiment.

FIG. 16 is a block diagram illustrating an example of a configuration example of processing functions provided in each device of a storage system according to a third embodiment. In FIG. 16, components that execute the same processes as FIG. 9 are indicated by the same reference numerals.

In the storage system according to the third embodiment, a hot proxy 100-1 illustrated in FIG. 16 is provided instead of the hot proxy 100 in the second embodiment. In place of the object servers 230a, 230b, and 230c in the second embodiment, object servers 230a-1, 230b-1, and 230c-1 illustrated in FIG. 16 are provided.

The object server 230a-1, like the object server 230a of the second embodiment, holds an object in charge of management in the storage. Objects include data and metadata. The difference from the object server 230a is that a flag set corresponding to an object is added to metadata. For example, as illustrated in FIG. 16, data 232a and metadata 233a for an object are stored in the storage of the object server 230a-1, and a flag set 234a corresponding to the object is registered in the metadata 233a.

The same applies to the object servers 230b-1 and 230c-1. That is, in the storage of the object server 230b-1, an object managed by the object server 230b-1 is held, and a flag set is registered in the metadata of each object. For example, as illustrated in FIG. 16, data 232b and metadata 233b for an object are stored in the storage of the object server 230b-1, and a flag set 234b corresponding to the object is registered in the metadata 233b.

In the storage of the object server 230c-1, an object managed by the object server 230c-1 is held, and a flag set is registered in metadata of each object. For example, as illustrated in FIG. 16, data 232c and metadata 233c for an object are stored in the storage of the object server 230c-1, and a flag set 234c corresponding to the object is registered in the metadata 233c.

The hot proxy 100-1 includes the interface processing unit 121, a command processing unit 122-1, a migration control unit 123-1, and a recall control unit 124-1. The processing of the interface processing unit 121, the command processing unit 122-1, the migration control unit 123-1, and the recall control unit 124-1 is realized, for example, by the processor of the hot proxy 100-1 executing a predetermined application program.

The processing of the command processing unit 122-1 is the same as that of the command processing unit 122 of the second embodiment except that one of the object servers 230a-1, 230b-1, and 230c-1 is accessed when referring to the flag set. The processing of the migration control unit 123-1 is the same as that of the migration control unit 123 of the second embodiment except that one of the object servers 230a-1, 230b-1, and 230c-1 is accessed when referring to the flag set. The processing of the recall control unit 124-1 is the same as the recall control unit 124 of the second embodiment except that one of the object servers 230a-1, 230b-1, and 230c-1 is accessed when referring to the flag set.

The command processing unit 122-1, the migration control unit 123-1, and the recall control unit 124-1 can read the metadata of the object and refer to the flag set by using a HEAD command. The command processing unit 122-1, the migration control unit 123-1, and the recall control unit 124-1 can update the metadata of the object and change the value of each flag in the flag set by using a PUT command or a POST command.

According to the above third embodiment, the same effect as that of the second embodiment can be obtained. According to the third embodiment, the amount of data held in the hot proxy 100-1 may be reduced as compared with the second embodiment by arranging the flag set for each object in the object servers 230a-1, 230b-1, and 230c-1. As a result, the storage capacity of the storage device mounted on the hot proxy 100-1 may be reduced, and the device cost of the hot proxy 100-1 may be reduced.

The processing function of the apparatuses (for example, the information processing apparatus 1, the client device 50, the hot proxy 100, the cold proxy 300, the account servers 210a, 210b, 210c, 410a, 410b, 410c, container servers 220a, 220b, 220c, 420a, 420b, 420c, and the object servers 230a, 230b, 230c, 430a, 430b, 430c) illustrated in each of the above embodiments may be realized by a computer. In that case, a program describing the processing content of the function that each device is supposed to have is provided, and the above processing function is realized on the computer by executing the program on the computer. The program in which the processing content is described may be recorded on a computer-readable recording medium. Examples of the computer-readable recording medium include a magnetic storage device, an optical disc, a magneto-optical recording medium, and a semiconductor memory. The magnetic storage device includes a hard disk drive (HDD), a flexible disk (FD), a magnetic tape, and the like. The optical disc includes a digital versatile disc (DVD), a DVD-RAM, a compact disc-read only memory (CD-ROM), a CD-R (Recordable)/RW (ReWritable), and the like. The magneto-optical recording media include a magneto-optical disk (MO) and the like.

In a case where the program is to be distributed, for example, portable recording media such as DVDs and CD-ROMs, in which the program is recorded, are sold. It is also possible to store the program in the storage device of the server computer and transfer the program from the server computer to another computer via a network.

The computer executing the program stores, for example, the program recorded on in a portable recording medium or the program transferred from a server computer in the own storage device. Then, the computer reads the program from the own storage device and executes processes according to the program. The computer may also read the program directly from the portable storage medium and execute processes according to the program. The computer may also execute processes according to a received program each time a program is transferred from a server computer connected via a network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for an information process, the method comprising:
    executing a reception process that includes receiving a request, the request including any of a first request and a second request; and
    executing a control process that includes
        performing a first process when the first request is received by the reception process, the first request being a request for executing a first migration process configured to migrate data from a first storage device to a second storage device having a higher access speed than the first storage device, the first process including recording state information indicating that the first migration process is being executed and starting the execution of the first migration process, and
        performing a second process when the second request is received by the reception process, the second request being a request for executing a second migration process configured to migrate the data from the second storage device to the first storage device, the second process including stopping the execution of the first migration process and starting the execution of the second migration process, in a case where the state information indicates that the first migration process is being executed.

2. The method according to claim 1,
    wherein the first migration process includes
        reading the data from the first storage device,
        writing the data to the second storage device, and
        deleting the data in the first storage device, and
    wherein the second migration process includes
        reading the data from the second storage device,
        writing the data to the first storage device, and
        invalidating the data in the second storage device.

3. The method according to claim 1,
    wherein the second process includes
        recording the state information indicating that the second migration process is being executed, in a case where a request for executing the second migration process is started, and
    wherein the first process includes
        stopping the execution of the second migration process and staring the execution of the first migration process, in a case where the state information indicates that the second migration process is being executed when the first request is received by the reception process.

4. The method according to claim 1,
    wherein the request received by the reception process includes any of the first request, the second request, and a third request, and
    wherein the control process further includes
        performing a third process when the third request is received by the reception process, the third request being a request for executing a third migration process configured to write update data for updating the data to the first storage device, the third process including stopping the execution of the first migration process and starting the execution of the third migration process, in a case where the state information indicates that the first migration process is being executed.

5. The method according to claim 1,
    wherein the request received by the reception process includes any of the first request, the second request, and a third request,
    wherein the control process further includes
        performing a third process when the third request is received by the reception process, the third request being a request for executing a third migration process configured to write update data for updating the data to the first storage device, the third process including recording the state information indicating that the third migration process is being executed and starting the execution of the third migration process, and
    wherein the second process includes
        avoiding the execution of the second migration process, in a case where the state information indicates that the third migration process is being executed when the second request is received by the reception process.

6. The method according to claim 1,
    wherein the request received by the reception process includes any of the first request, the second request, and a third request,
    wherein the control process further includes
        performing a third process when the third request is received by the reception process, the third request being a request for executing a third migration process configured to write update data for updating the data to the first storage device, the third process including recording the state information indicating that the third migration process is being executed and starting the execution of the third migration process, and
    wherein the first process includes
        avoiding the execution of the first migration process, in a case where the state information indicates that the third migration process is being executed when the first request is received by the reception process.

7. An apparatus for an information process, the apparatus comprising:
a memory; and
a processor coupled to the memory, the processor being configured to
execute a reception process that includes receiving a request, the request including any of a first request and a second request; and
execute a control process that includes
performing a first process when the first request is received by the reception process, the first request being a request for executing a first migration process configured to migrate data from a first storage device to a second storage device having a higher access speed than the first storage device, the first process including recording state information indicating that the first migration process is being executed and starting the execution of the first migration process, and
performing a second process when the second request is received by the reception process, the second request being a request for executing a second migration process configured to migrate the data from the second storage device to the first storage device, the second process including stopping the execution of the first migration process and starting the execution of the second migration process, in a case where the state information indicates that the first migration process is being executed.

8. The apparatus according to claim 7,
wherein the first migration process includes
reading the data from the first storage device,
writing the data to the second storage device, and
deleting the data in the first storage device, and
wherein the second migration process includes
reading the data from the second storage device,
writing the data to the first storage device, and
invalidating the data in the second storage device.

9. The apparatus according to claim 7,
wherein the second process includes
recording the state information indicating that the second migration process is being executed, in a case where a request for executing the second migration process is started, and
wherein the first process includes
stopping the execution of the second migration process and staring the execution of the first migration process, in a case where the state information indicates that the second migration process is being executed when the first request is received by the reception process.

10. The apparatus according to claim 7,
wherein the request received by the reception process includes any of the first request, the second request, and a third request, and
wherein the control process further includes
performing a third process when the third request is received by the reception process, the third request being a request for executing a third migration process configured to write update data for updating the data to the first storage device, the third process including stopping the execution of the first migration process and starting the execution of the third migration process, in a case where the state information indicates that the first migration process is being executed.

11. The apparatus according to claim 7,
wherein the request received by the reception process includes any of the first request, the second request, and a third request,
wherein the control process further includes
performing a third process when the third request is received by the reception process, the third request being a request for executing a third migration process configured to write update data for updating the data to the first storage device, the third process including recording the state information indicating that the third migration process is being executed and starting the execution of the third migration process, and
wherein the second process includes
avoiding the execution of the second migration process, in a case where the state information indicates that the third migration process is being executed when the second request is received by the reception process.

12. The apparatus according to claim 7,
wherein the request received by the reception process includes any of the first request, the second request, and a third request,
wherein the control process further includes
performing a third process when the third request is received by the reception process, the third request being a request for executing a third migration process configured to write update data for updating the data to the first storage device, the third process including recording the state information indicating that the third migration process is being executed and starting the execution of the third migration process, and
wherein the first process includes
avoiding the execution of the first migration process, in a case where the state information indicates that the third migration process is being executed when the first request is received by the reception process.

13. A non-transitory computer-readable storage medium for storing a program which causes a processor to perform processing, the processing comprising:
executing a reception process that includes receiving a request, the request including any of a first request and a second request; and
executing a control process that includes
performing a first process when the first request is received by the reception process, the first request being a request for executing a first migration process configured to migrate data from a first storage device to a second storage device having a higher access speed than the first storage device, the first process including recording state information indicating that the first migration process is being executed and starting the execution of the first migration process, and
performing a second process when the second request is received by the reception process, the second request being a request for executing a second migration process configured to migrate the data from the second storage device to the first storage device, the second process including stopping the execution of the first migration process and starting the execution of the second migration process, in a case where the state information indicates that the first migration process is being executed.

14. The non-transitory computer-readable storage medium according to claim 13,
wherein the first migration process includes
reading the data from the first storage device,
writing the data to the second storage device, and
deleting the data in the first storage device, and
wherein the second migration process includes
reading the data from the second storage device,
writing the data to the first storage device, and
invalidating the data in the second storage device.

15. The non-transitory computer-readable storage medium according to claim 13,
wherein the second process includes
recording the state information indicating that the second migration process is being executed, in a case where a request for executing the second migration process is started, and
wherein the first process includes
stopping the execution of the second migration process and staring the execution of the first migration process, in a case where the state information indicates that the second migration process is being executed when the first request is received by the reception process.

16. The non-transitory computer-readable storage medium according to claim 13,
wherein the request received by the reception process includes any of the first request, the second request, and a third request, and
wherein the control process further includes
performing a third process when the third request is received by the reception process, the third request being a request for executing a third migration process configured to write update data for updating the data to the first storage device, the third process including stopping the execution of the first migration process and starting the execution of the third migration process, in a case where the state information indicates that the first migration process is being executed.

17. The non-transitory computer-readable storage medium according to claim 13,
wherein the request received by the reception process includes any of the first request, the second request, and a third request,
wherein the control process further includes
performing a third process when the third request is received by the reception process, the third request being a request for executing a third migration process configured to write update data for updating the data to the first storage device, the third process including recording the state information indicating that the third migration process is being executed and starting the execution of the third migration process, and
wherein the second process includes
avoiding the execution of the second migration process, in a case where the state information indicates that the third migration process is being executed when the second request is received by the reception process.

18. The non-transitory computer-readable storage medium according to claim 13,
wherein the request received by the reception process includes any of the first request, the second request, and a third request,
wherein the control process further includes
performing a third process when the third request is received by the reception process, the third request being a request for executing a third migration process configured to write update data for updating the data to the first storage device, the third process including recording the state information indicating that the third migration process is being executed and starting the execution of the third migration process, and
wherein the first process includes
avoiding the execution of the first migration process, in a case where the state information indicates that the third migration process is being executed when the first request is received by the reception process.

* * * * *